US011838921B2

(12) United States Patent
Takeda et al.

(10) Patent No.: US 11,838,921 B2
(45) Date of Patent: Dec. 5, 2023

(54) MULTI-CHANNEL DOWNLINK SCHEDULING WITH MISS DETECTION BASED ON VARIABLE BITWIDTH INDEX

(71) Applicant: QUALCOMM Incorporated, San Diego, CA (US)

(72) Inventors: Kazuki Takeda, Tokyo (JP); Sony Akkarakaran, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 177 days.

(21) Appl. No.: 17/444,553

(22) Filed: Aug. 5, 2021

(65) Prior Publication Data
US 2022/0046693 A1 Feb. 10, 2022

Related U.S. Application Data

(60) Provisional application No. 63/063,197, filed on Aug. 7, 2020.

(51) Int. Cl.
*H04W 72/12* (2023.01)
*H04W 72/232* (2023.01)
*H04W 72/23* (2023.01)
*H04L 1/1867* (2023.01)
*H04W 72/1273* (2023.01)
*H04W 72/0453* (2023.01)

(52) U.S. Cl.
CPC ........... *H04W 72/23* (2023.01); *H04L 1/1896* (2013.01); *H04W 72/0453* (2013.01); *H04W 72/1273* (2013.01)

(58) Field of Classification Search
CPC ............ H04L 1/1896; H04W 72/1289; H04W 72/23; H04W 72/0453; H04W 72/1896; H04W 72/1273
See application file for complete search history.

(56) References Cited

U.S. PATENT DOCUMENTS

| | | | |
|---|---|---|---|
| 2018/0323938 A1 | 11/2018 | Takeda et al. | |
| 2020/0119869 A1* | 4/2020 | Taherzadeh Boroujeni | ................ H04B 7/0695 |
| 2020/0305168 A1* | 9/2020 | Liou | ...................... H04W 76/11 |
| 2020/0412485 A1* | 12/2020 | Wang | .................... H04L 1/0073 |

(Continued)

FOREIGN PATENT DOCUMENTS

WO 2020141994 A1 7/2020

OTHER PUBLICATIONS

International Search Report and Written Opinion—PCT/US2021/045073—ISA/EPO—dated Dec. 8, 2021.

*Primary Examiner* — Kent Krueger
(74) *Attorney, Agent, or Firm* — Arun Swain

(57) ABSTRACT

A base station may transmit downlink control information messages (DCIs) that schedule multiple physical downlink shared channels (PDSCHs) in a single DCI (multi-PDSCH DCIs) to a UE. The base station may generate DCIs with multiple downlink association index (DAI) bitwidths. The base station generate a given DCI with a DAI bitwidth based on a DCI format of the DCI, based on whether the DCI is a multi-PDSCH DCI, based on a carrier that the DCI is transmitted on, or whether the base station is capable of scheduling the UE with multi-PDSCH DCIs in general. The UE may determine the DAI bitwidth of received DCIs and may determine whether any DCIs were missed based on the DAI and the bitwidth of the DAI.

30 Claims, 19 Drawing Sheets

(56) References Cited

U.S. PATENT DOCUMENTS

| | | | | |
|---|---|---|---|---|
| 2022/0095351 A1* | 3/2022 | Baldemair | ............ | H04W 72/23 |
| 2022/0240228 A1* | 7/2022 | Matsumura | ........... | H04L 1/1861 |
| 2022/0256573 A1* | 8/2022 | Frenne | ................. | H04L 5/0053 |
| 2022/0271873 A1* | 8/2022 | Gao | ....................... | H04L 1/1887 |
| 2022/0369350 A1* | 11/2022 | Yoshimura | ............ | H04W 72/23 |
| 2022/0393829 A1* | 12/2022 | Kim | ......................... | H04L 1/18 |
| 2023/0050015 A1* | 2/2023 | Kang | ....................... | H04L 5/00 |

\* cited by examiner

| DCI | DAI Bits | DAI |
|---|---|---|
| DCI 1 | 0 0 | 0 |
| DCI 2 | 0 1 0 | 2 |
| DCI 3 | 1 0 0 | 4 |
| DCI 4 | 0 1 | 5 |
| DCI 5 | 1 1 0 | 6 |

MULTI-CHANNEL DOWNLINK SCHEDULING WITH MISS DETECTION BASED ON VARIABLE BITWIDTH INDEX

CROSS REFERENCE TO RELATED APPLICATION(S)

This application claims the benefit of U.S. Provisional Application No. 63/063,197, entitled "MULTI-CHANNEL DOWNLINK SCHEDULING WITH MISS DETECTION BASED ON VARIABLE BITWIDTH INDEX" and filed on Aug. 7, 2020, the disclosure of which is expressly incorporated by reference herein in its entirety.

BACKGROUND

Technical Field

The present disclosure relates generally to wireless communication systems, and more particularly, to detecting downlink transmissions missed by a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Wireless devices sending and receiving transmissions in wireless communication systems may perform miss detection procedures to determine if another wireless device transmitted a message to the wireless device that it did not receive. For example, a series of downlink control information messages (DCIS) for a wireless device may include respective downlink assignment index (DAI) values. The DAI values may increase sequentially from DCI to DCI in a manner that the receiving wireless device may be able to anticipate. When a DAI value for a received DCI changes in a manner different than anticipated by the wireless device for the next DCI transmission, the wireless device may detect that it missed a DCI. However, the the DAI bitwidth field is limited to 2 bits, therefore, if more than a certain number of DCIS (e.g., more than 2 DCIS) are missed, then the DAI value may no longer be reliable to accurately detect all of the missed DCIS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may generate a plurality of downlink control information messages (DCIS), the DCIS identifying respective physical downlink shared channel (PDSCH) resources for a user equipment (UE), a first DCI of the plurality of DCIS having a multi-PDSCH format, the multi-PDSCH format being a format usable to identify PDSCH resources for multiple PDSCHs, a number of bits for a downlink assignment index for a second DCI of the plurality of DCIs being based on a format of the second DCI, based on a carrier for the second DCI, or based on the first DCI having the multi-PDSCH format; and may transmit the plurality of DCIs to the UE.

In some aspects, the downlink assignment index for the second DCI has at least three bits based on the first DCI having the multi-PDSCH format.

In some aspects, generating the plurality of DCIs includes determining a format for the second DCI, and wherein the downlink assignment index for the second DCI has a number of bits based on the format of the second DCI.

In some aspects, the downlink assignment index for the second DCI has two bits based on the format of the second DCI being a common search space format or the downlink assignment index for the second DCI has at least three bits based on the format of the second DCI being a format other than the common search space format.

In some aspects, transmitting the plurality of DCIs to the UE includes transmitting a first DCI to the UE, transmitting a second DCI to the UE after the first DCI, and transmitting a third DCI to the UE after transmitting the second DCI, wherein the base station does not transmit any other DCI to the UE between the first DCI and the third DCI, and wherein the base station generates the third DCI with the common search space format based on a format for the first DCI being the common search space format and a format for the second DCI being a format other than the common search space format.

In some aspects, generating the plurality of DCIs includes determining a format for the second DCI, and wherein the downlink assignment index for the second DCI has a number of bits based on the format for the second DCI being the multi-PDSCH format.

In some aspects, the downlink assignment index for the second DCI has at least three bits based on the format for the second DCI being the multi-PDSCH format.

In some aspects, transmitting the plurality of DCIs to the UE includes transmitting a first DCI to the UE, transmitting a second DCI to the UE after the first DCI, and transmitting a third DCI to the UE after transmitting the second DCI, wherein the base station does not transmit any other DCI to the UE between the first DCI and the third DCI, and wherein the base station generates the third DCI with the multi-PDSCH format based on a format for the first DCI being a format other than the multi-PDSCH format and a format for a DCI of the second PDCCH being the multi-PDSCH format.

In some aspects, the downlink assignment index for the second DCI has at least three bits based on the format for the second DCI being a format other than the multi-PDSCH format.

In some aspects, transmitting the plurality of DCIs to the UE includes transmitting a first DCI to the UE, transmitting a second DCI to the UE after the first DCI, and transmitting a third DCI to the UE after transmitting the second DCI, wherein the base station does not transmit any other DCI to the UE between the first DCI and the third DCI, and wherein the base station generates the third DCI with a format other than the multi-PDSCH format based on a format for the first DCI being the multi-PDSCH format and a format for the second DCI being a format other than the multi-PDSCH format.

In some aspects, the base station transmits the plurality of DCIs on a first carrier and a second carrier, and wherein the downlink assignment index for the second DCI has a number of bits based on whether the second DCI is transmitted on the first carrier or the second carrier.

In some aspects, the downlink assignment index for the second DCI has at least three bits based on the second DCI being transmitted on the first carrier or the downlink assignment index for the second DCI has two bits based on the second DCI being transmitted on the second carrier.

In some aspects, the base station may transmit a radio resource control message identifying the first carrier to the UE based on the second DCI being transmitted on the first carrier having at least three bits.

In some aspects, transmitting the plurality of DCIs to the UE includes transmitting a first DCI to the UE, transmitting a second DCI to the UE after the first DCI, and transmitting a third DCI to the UE after transmitting the second DCI, wherein the base station does not transmit any other DCI to the UE between the first DCI and the third DCI, and wherein the base station transmits the third DCI on the first carrier based on transmitting the first DCI on the second carrier and transmitting the second PDCCH on the first carrier.

In another aspect of the disclosure, a method, a computer-readable medium, and an apparatus are provided. The apparatus may be a user equipment (UE). The apparatus may receive a plurality of downlink control information messages (DCIs) from a base station, the DCIs identifying physical downlink shared channel (PDSCH) resources for the UE; may determine a number of downlink assignment index bits of a first DCI of the plurality of DCIs based on a format of the first DCI, based on a carrier for the first DCI, or based on a DCI of the plurality of DCIs having a multi-PDSCH format, the multi-PDSCH format being a format that can identify PDSCH resources for multiple PDSCHs; and may determine that the base station transmitted a third DCI to the UE that the UE did not receive based on the first DCI and the determined number of DAI bits for the first DCI.

In some aspects, In some aspects, the number of downlink assignment index bits is determined based on a DCI of the plurality of DCI formats having the multi-PDSCH format.

In some aspects, the number of downlink assignment index bits is determined based on a format of the first DCI.

In some aspects, the UE determines that the first DCI has three or more downlink assignment index bits based on the first DCI having a common search space format.

In some aspects, the UE determines that the first DCI has three or more downlink assignment index bits based on the first DCI having the multi-PDSCH format.

In some aspects, the UE determines that the first DCI has three or more downlink assignment index bits based on the first DCI having a format other than the multi-PDSCH format.

In some aspects, the UE receives the plurality of DCIs on a first carrier and on a second carrier, and wherein the UE determines that the first DCI has three or more downlink assignment index bits based on receiving the first DCI on the first carrier.

In some aspects, the UE may receiving an indicator identifying the first carrier from the base station, wherein the UE determines that the first DCI has three or more downlink assignment index bits based on the indicator.

In some aspects, determining that the base station transmitted the third DCI to the UE includes comparing the downlink assignment index bits of the first DCI to downlink assignment index bits of a fourth DCI of the plurality of DCIs, and the UE receives the fourth DCI before the first DCI and the UE does not receive another DCI between the fourth DCI and the first DCI.

In some aspects, the UE may determine the number of downlink assignment index bits of the first DCI to be two bits or to be three or more bits, the downlink assignment index bits of the first DCI are based on a downlink assignment index value of the first DCI; the UE determines that the base station transmitted the third DCI to the UE based on a modulus of the downlink assignment index modulo four based on determining the number of downlink assignment index bits of the first DCI to be two, and the UE determines that the base station transmitted the third DCI to the UE based on a modulus of the downlink assignment index modulo eight or more based on determining the number of downlink assignment index bits of the first DCI to be three or more.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 is a diagram illustrating a DAI procedure with mixed DAI bitwidths.

DETAILED DESCRIPTION

Figure 1:
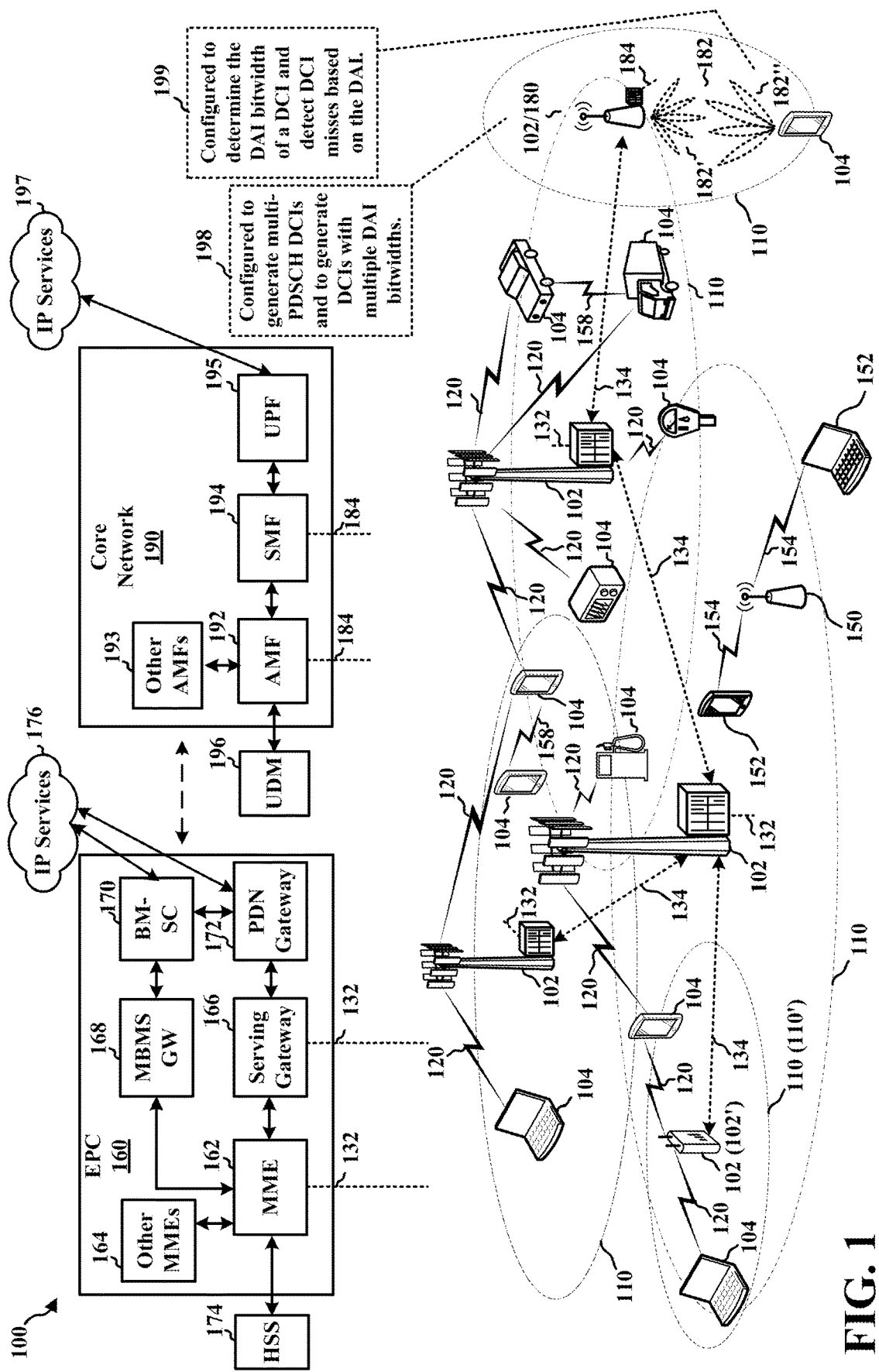
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As described above, due to the limited size of the DAI bitwidth field, if more than a certain number of downlink transmissions are missed (e.g., more than 2 DCIS), then a receiving device may no longer reliably detect the missed downlink transmissions and the issue of the missed downlink transmissions may not be resolved. Accordingly, various aspects of the disclosure herein relate generally to techniques for detecting downlink transmissions missed by a receiving device, and more specifically, to using an index with a variable bitwidth to enable the reliable detection of missed downlink transmissions. In some examples, a base station may transmit a series of downlink control information (DCI) messages each including a respective set of downlink assignment index (DAI) bits having a bitwidth that may vary from DCI to DCI. The base station may set (for example, based on a use case) the bitwidth of each DCI message to enable detection of any missed DCI at the receiving device. In some implementations, the base station may use a DCI format with the capacity to schedule multiple downlink data channels in a single DCI, which may be referred to as a multi-physical downlink shared channel (multi-PDSCH) DCI. In some examples, the base station may generate the DCI with a DAI bitwidth, the size of which is based specifically on a DCI format of the DCI. For example, the base station may select the bitwidth to be used for a given DCI based on whether the DCI is a multi-PDSCH DCI. For example, the base station may use a base DAI bitwidth (for example, two bits) or an expanded DAI bitwidth (for example, three or more bits). Additionally or alternatively, the base station may select the bitwidth to be used for a given DCI based on a carrier that the DCI is transmitted on, or whether the base station is capable of scheduling the UE with multi-PDSCH DCIs in general. A user equipment (UE) receiving the series of DCI messages from the base station may determine the respective DAI bitwidths and, based on the DAI bitwidths, determine whether it missed one or more DCI from the base station.

Particular implementations of the subject matter described in this disclosure can be implemented to realize one or more of the following potential advantages. Aspects of the present disclosure provide an enhanced miss detection procedure, such as an enhanced DAI procedure, that may provide improved miss detection accuracy and/or reliability. Among other aspects, the disclosed techniques may allow a receiving device to miss one or more DCIs (e.g., three or more consecutive multi-PDSCH DCIs) and accurately detect the missed DCIs. For example, by using a DAI bitwidth based on the use of a multi-PDSCH DCI format, a DCI format of the DCI, a carrier that the DCI is transmitted on, or whether the base station is capable of scheduling the UE with multi-PDSCH DCIs in general, the transmitting device may prevent errors caused by a jump in DAI value associated with scheduling multiple PDSCHs on a single DCI. Furthermore, using a DAI bitwidth as described herein also allows the transmitting device to reliably and accurately detect any missed DCIs without having to increase the DAI bitwidth for every DCI, which may eliminate or reduce the overhead of increasing the bitwidth with every DCI. Among other aspects, the disclosed techniques may allow a transmitting device to utilize a single DCI to schedule multiple PDSCHs for a receiving device without reducing the accuracy and/or reliability of DCI miss detection by the receiving device or with a limited or reduced impact on the accuracy and/or reliability of DCI miss detection by the receiving device.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (for example, 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to generate multi-PDSCH DCIS and to generate DCIS with multiple DAI bitwidths (198). For example, the base station 180 may be configured to generate DCIS with a base DAI bitwidth or with an expanded DAI bitwidth. In certain aspects, the UE 104 may be configured to determine the DAI bitwidth of a DCI received from the base station 180 and to detect DCI misses, or DCI transmitted to the UE 104 by the base station 180 but not received by the UE 104, based on the DAI of the DCI in accordance with the determined DAI bitwidth of the DCI. Although the following description may be focused in some areas on joint scheduling DCI used for scheduling PDSCHs in multiple carriers using a single DCI on a single carrier, the concepts described herein may be applicable to other similar areas where a single DCI schedules multiple PDSCHs. Although some aspects of the following description may be focused on 5G NR, the concepts described herein may be applicable to other similar areas, such as LTE, LTE-A, CDMA, GSM, and other wireless technologies.

Figure 2:
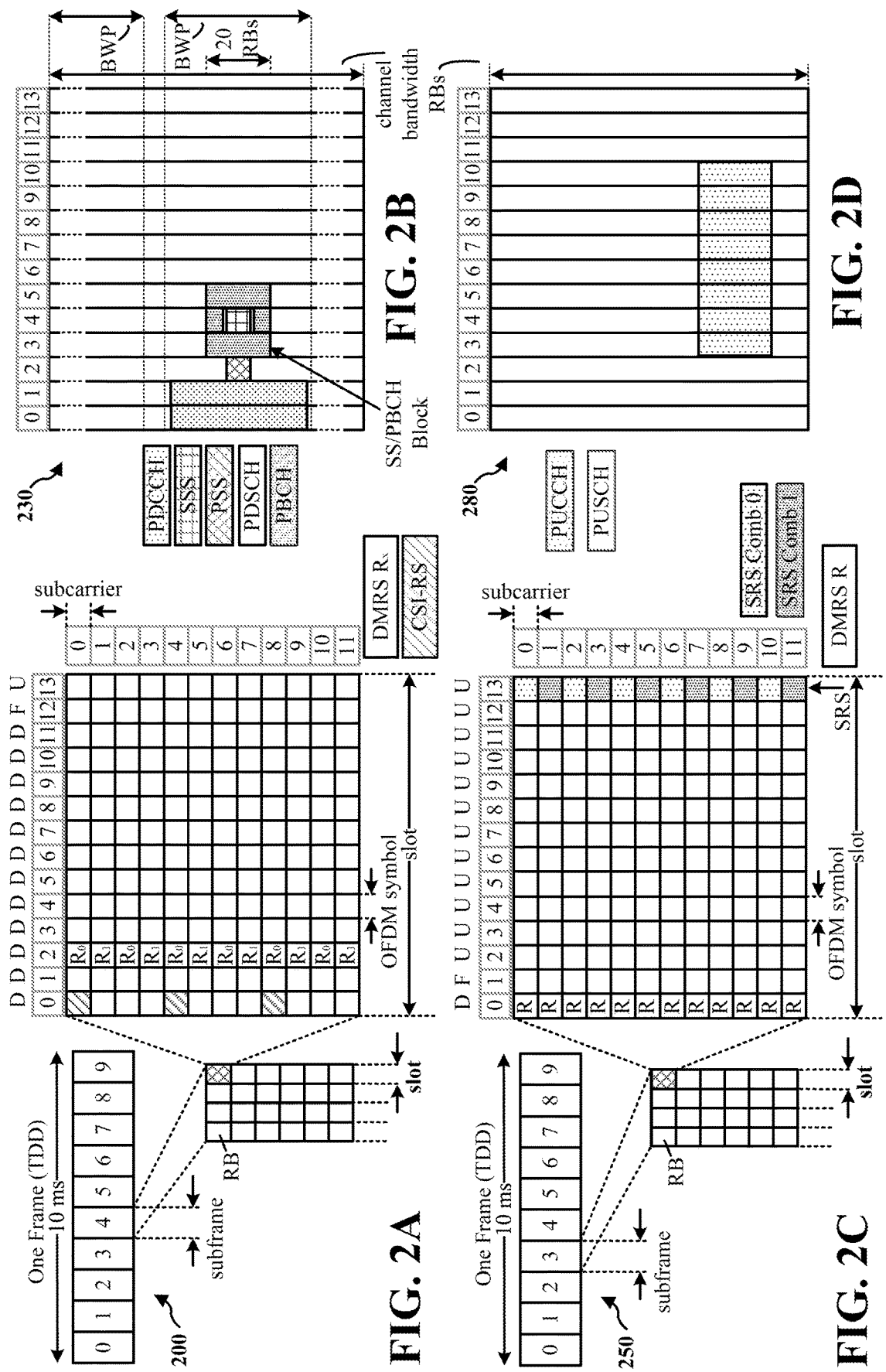
FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A and 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), or UCI.

Figure 3:
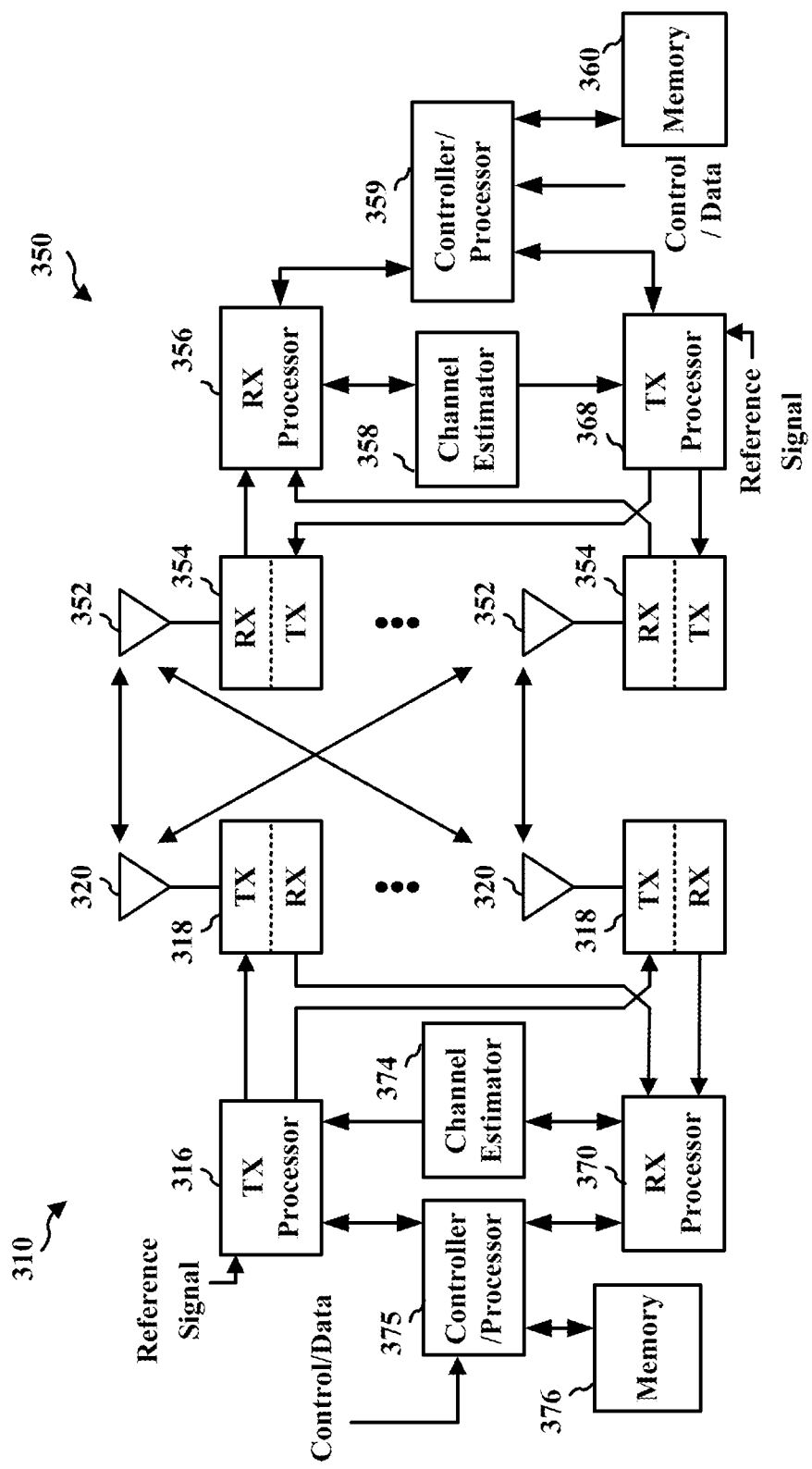
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example, MIB, SIBs), RRC connection control (for example, RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example, pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
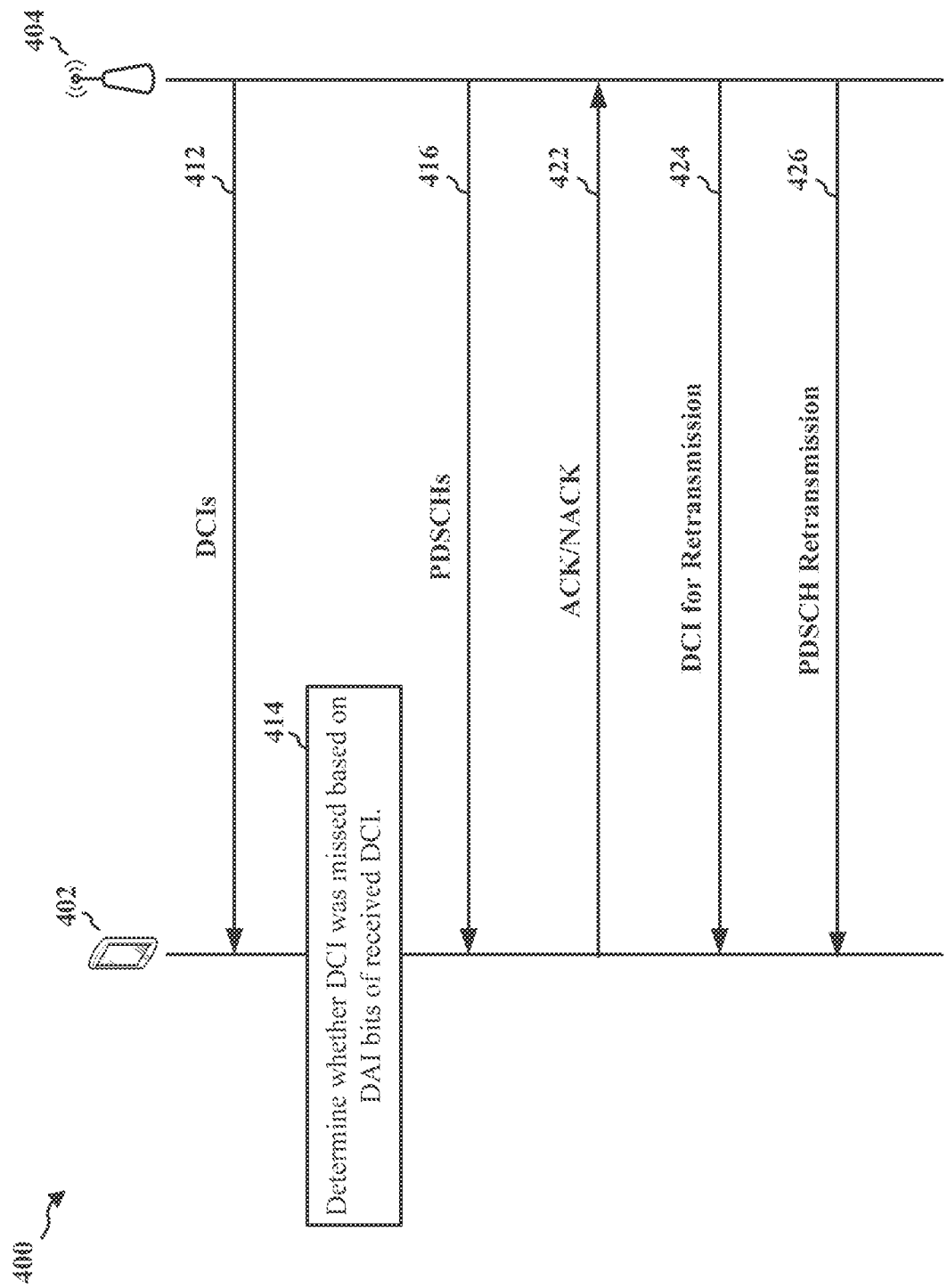
FIG. 4 is a communication flow diagram illustrating a downlink scheduling and feedback procedure.

FIG. 4 is a communication flow diagram illustrating a downlink scheduling and feedback procedure 400. A base station 404 may be scheduling a UE 402 to receive downlink channels (hereinafter 'PDSCHs') from the base station 404.

The base station 404 may transmit DCIs 412 to the UE 402. For example, the base station 404 may transmit PDCCHs containing the DCIs 412 to the UE 402 during PDCCH monitoring occasions. A DCI may indicate future PDSCH resources which the base station 402 will use to transmit a PDSCH to the UE 402. Each DCI may identify resources for one PDSCH.

The UE 402 may perform blind monitoring of the PDCCH monitoring occasions. The UE 402 may decode any PDCCH received during a PDCCH monitoring occasion and determine whether the received PDCCH contains a DCI for the UE 402. For example, the UE 402 may decode a received PDCCH and utilize the cyclic redundancy check (CRC) value to determine whether the received PDCCH was intended for the UE 402.

The UE 402 may miss a DCI transmitted from the base station 404 to the UE 402. For example, the UE 402 may receive a PDCCH containing DCI for the UE 402, but there may be an error in the CRC resulting in the UE 402 incorrectly determining that the PDCCH was not intended for the UE 402. When the UE 402 misses a DCI, the UE 402 will not know the PDSCH resources indicated in the DCI and will not receive the PDSCH transmitted on those resources.

Each DCI may include downlink assignment index (DAI) bits to allow the UE 402 to determine if it has missed a DCI. For example, each DCI may include two DAI bits. Each PDSCH that will share the same PUCCH resource for acknowledgement/negative acknowledgement (ACK/NACK) feedback (for example, HARQ feedback) may be assigned a separate DAI value. The DAI values may be in increasing order, one integer at a time, based on the order that the DCIs scheduling the PDSCHs is transmitted. For example, the PDSCH scheduled by the first transmitted DCI may have a DAI value of 0, the PDSCH scheduled by the second transmitted DCI may have a DAI value of 1, etc. The DAI bits of a DCI scheduling a PDSCH may be based on a modulus of the DAI value for the PDSCH. For example, where two DAI bits are used, the DAI bits may be set using a modulo four operation, as two bits may have four possible configurations (01, 10, 11, and 00). A DCI scheduling a PDSCH with a DAI value of six may have DAI bits of 1 and 0, a DCI scheduling a PDSCH with a DAI value of seven may DAI bits of 1 and 1, and a DCI scheduling a PDSCH with a DAI value of eight may have DAI bits of 0 and 0.

Figure 5:
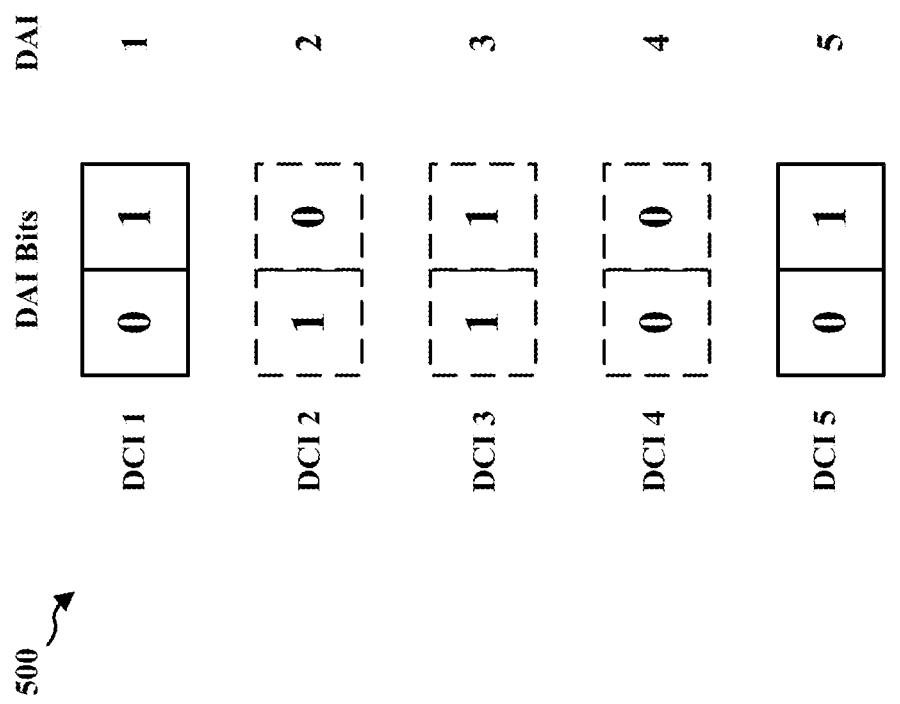
FIG. 5 is a diagram illustrating a downlink assignment index (DAI) procedure.

As illustrated at 414, the UE 414 may determine whether it missed one or more of the DCIs 412 transmitted to the UE 402 by the base station 404 based on the DAI bits of DCI that the UE 402 did receive. Because the DAI values of the PDSCHs scheduled by the DCIS 412 increase in the order that the DCIS 412 are transmitted, the UE 402 may monitor the DAI bits of received DCIS to verify that they increase by one with each received DCI. For example, when the UE 402 receives a DCI with DAI bits of 1 and 0, the next DCI may be expected to have DAI bits of 1 and 1. When the UE 402 receives a DCI with DAI bits that correspond to a value with an increase of more than one, the UE 402 may determine that it missed a DCI from the base station 404. FIG. 5 provides an example of this DAI procedure.

FIG. 5 is a diagram illustrating a DAI procedure 500. A base station may transmit DCI 1, scheduling a PDSCH with a DAI of zero; DCI 2, scheduling a PDSCH with a DAI of one; DCI 3, scheduling a PDSCH with a DAI of two; DCI 4, scheduling a PDSCH with a DAI of three; and DCI 5, scheduling a PDSCH with a DAI of four, to a UE. Each DCI may have two DAI bits. The DAI bits of DCI 1 may be set to 0 and 0 based on the DAI of zero. The DAI bits of DCI 2 may be set to 0 and 1 based on the DAI of one. The DAI bits of DCI 3 may be set to 1 and 0 based on the DAI of two. The DAI bits of DCI 4 may be set to 1 and 1 based on the DAI of three. The DAI bits of DCI 5 may be set to 0 and 0 based on the DAI of four, as the modulus of 4 is zero.

The UE may monitor the DAI bits of received DCI to determine if it missed any DCI. The UE may miss up to three consecutive DCIS and still determine that the DCIS were missed. For example, the UE may receive DCI 1 and DCI 5, but may miss DCI 2, DCI 3, and DCI 4. The UE may determine that the DAI bits went from 0 and 0 for DCI 1 to 0 and 0 for DCI 5. Because three values were skipped, the UE may determine that three DCIS were missed.

Referring again to FIG. 4, the base station 404 may transmit PDSCHs 416 to the UE 402 on the PDSCH resources identified in the in the DCIS 412. The UE 402 may monitor the PDSCH resources identified in DCIS of the DCIS 412 which it successfully received to receive the PDSCHs transmitted on those resources. The UE 402 may not receive PDSCHs transmitted on PDSCH resources identified in DCIS that the UE 402 missed. The UE 402 may attempt to decode the received PDSCHs.

The UE 402 may generate ACK/NACK feedback 422 based on the received PDSCHs and the missed DCIS. The UE may generate ACK bits for the PDSCHs received and decoded successfully, may generate NACK bits for the PDSCHs received but not decoded successfully, and may generate NACK bits for PDSCHs of missed DCIS. The UE 402 may transmit the ACK/NACK feedback 422 to the base station 404.

The base station 404 may receive the ACK/NACK feedback 422 from the UE 402. The base station 404 may determine to retransmit some or all of the PDSCHs for which it received corresponding NACK feedback. The base station 404 may transmit DCI 424 to the UE 402, identifying PDSCH resources for retransmission of a PDSCH that will be retransmitted, and may retransmit the PDSCH 426 to the UE 402. The UE 402 may receive the DCI 424 and receive the retransmitted PDSCH 426 on the resources identified in the DCI 424.

Figure 6:
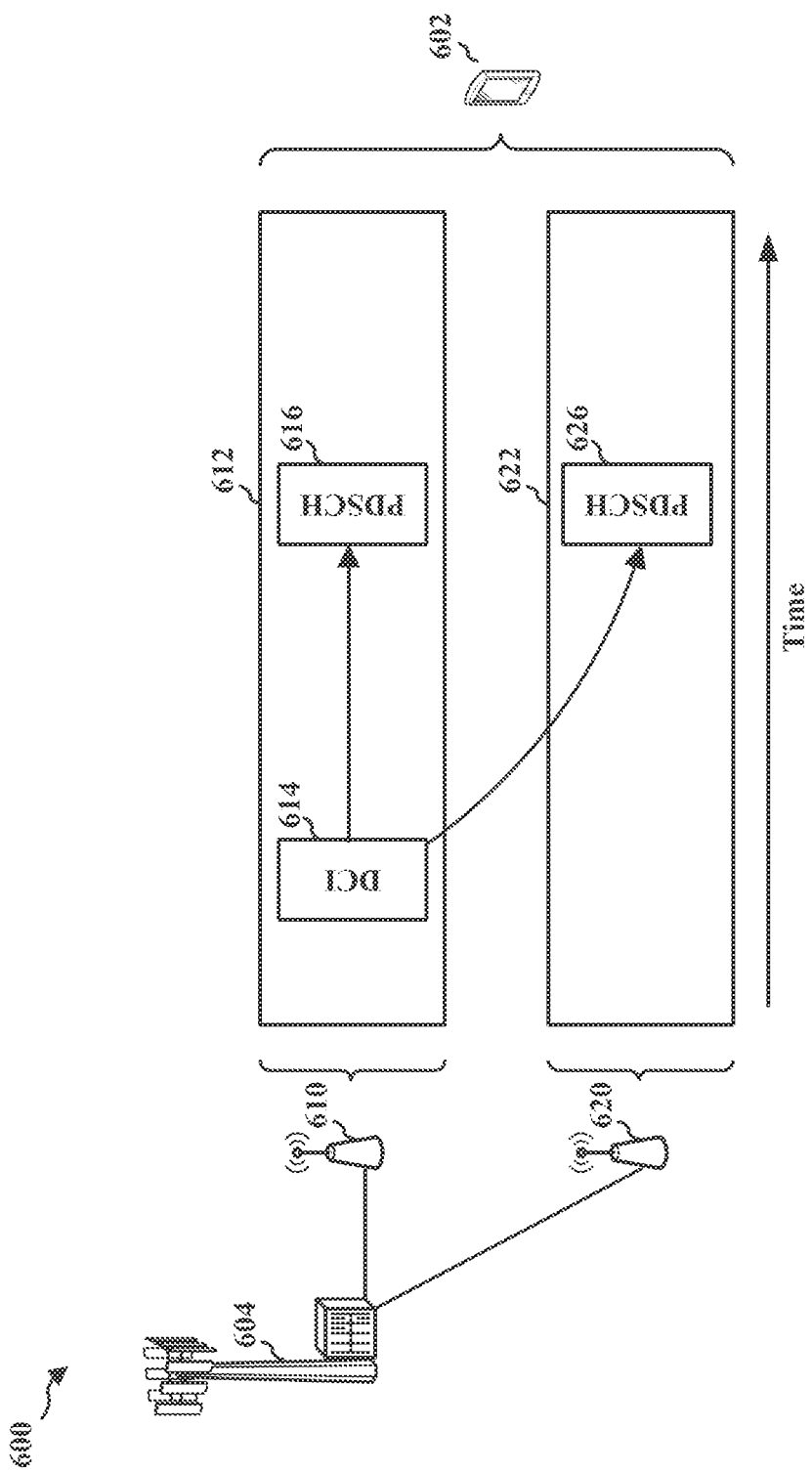
FIG. 6 is a diagram illustrating a joint scheduling procedure used in carrier aggregation.

FIG. 6 is a diagram illustrating a joint scheduling procedure 600 used in carrier aggregation. A base station 604 may communicate with a UE 602 using a first cell 610 and a second cell 610. The first cell 610 may communicate with the UE 602 on a first carrier 612. The second cell 620 may communicate with the UE 602 on a second carrier 622. For example, the first carrier 612 may be on a first RAN and the second carrier 622 may be on a second RAN, or the first carrier 612 may be on the NR-licensed spectrum and the second carrier 622 may be on the NR-unlicensed spectrum. In some aspects, the first cell 610 may be a PCell or a primary secondary cell group cell (PSCell) and the second cell 620 may be an SCell. In some aspects, the first cell 610 may be an SCell and the second cell 620 may be a PCell or a PSCell.

The base station 610 may transmit DCI 614 to the UE 602 on the first spectrum 612 through the first cell. The DCI 614 may be a joint scheduling DCI. The DCI 614 may identify resources for a PDSCH 616 on the first carrier 612. The DCI 614 may also identify resources for a second PDSCH 626 on the second carrier 622. The UE 602 may receive the DCI 614, receive the resources identified for the PDSCH 616 and for the second PDSCH 626, and may receive the PDSCH 616 on the first carrier 612 and may receive the second PDSCH 626 on the second carrier 622.

The joint scheduling DCI 614 may be an example of a DCI that can schedule multiple PDSCHs. It may be a single DCI which identifies PDSCH resources for more than one PDSCH.

Figure 7:
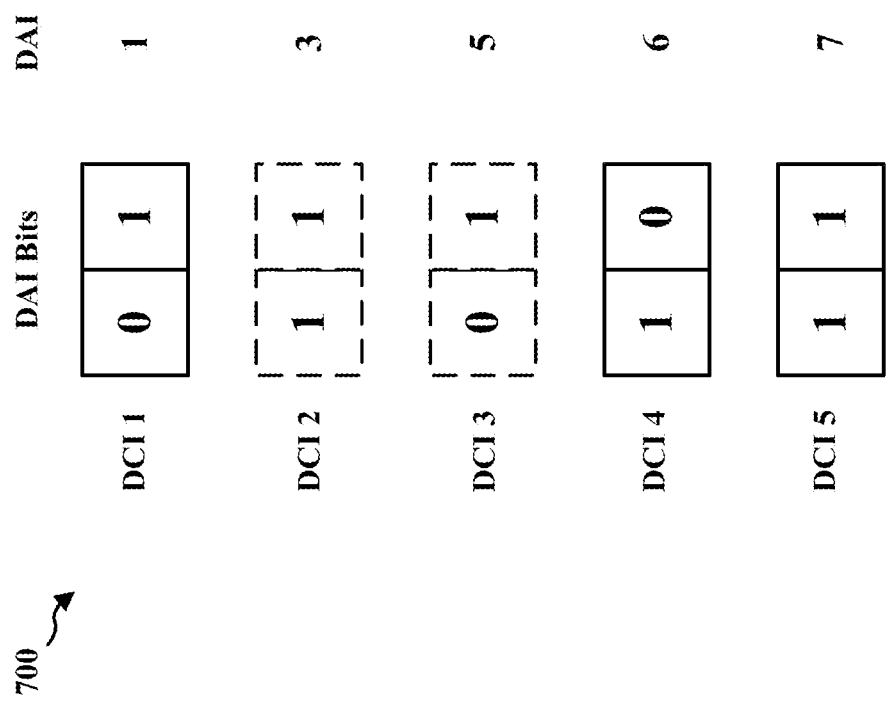
FIG. 7 is a diagram illustrating a DAI procedure with joint scheduling.

FIG. 7 is a diagram illustrating a DAI procedure 700 with joint scheduling. A base station may transmit DCI 1, DCI 2, DCI 3, DCI 4, and DCI 5 to a UE in that order. DCI 2 and DCI 3 may each identify resources for two PDSCHs (for example, DCI 2 and DCI 3 may be joint scheduling DCIs). DCI 1, DCI 4, and DCI 5 may each identify resources for a single PDSCH.

As described above, PDSCHs which will have ACK/NACK feedback on the same PUCCH are assigned separate DAI values. A joint scheduling DCI that identifies resources for two PDSCHs may therefore have DAI bits which represent an increase of two over the DAI bits of the previous DCI. Accordingly, while the DAI bits of DCI 1 correspond to a DAI value of zero, the DAI bits of DCI 2 correspond to a DAI value of two, an increase of two over the DAI value of DCI 1. Similarly, the DAI bits of DCI 3 correspond to a DAI value of four, another increase of two. The DAI bits of DCI 4 correspond to a DAI value of five, and the DAI bits of DCI 5 correspond to a DAI value of six, both increases of one.

The UE may receive DCI 1, DCI 4, and DCI 5, but may miss DCI 2 and DCI 3. However, because the DAI bits of DCI 1 are 0 and 0 and the DAI bits of DCI 4 are 0 and 1 (consistent with both a DAI value of five and a DAI value of two), the UE will not determine that a DCI was missed based on the DAI bits of the received DCI. If the UE does determine that a DCI was missed (for example, based on a total number of DCI received being less than an expected number), the UE may not know which DCI or DCIS were missed. When generating ACK/NACK feedback, the UE may not know to include NACK bits for the missed DCI or may not know where to include the NACK bits.

As can be seen, where DCI capable of scheduling multiple PDSCHs has a bitwidth of two, a UE may only be able to miss one consecutive DCI which schedules multiple PDSCHs without having a DAI miss-detection issue.

Figure 8:
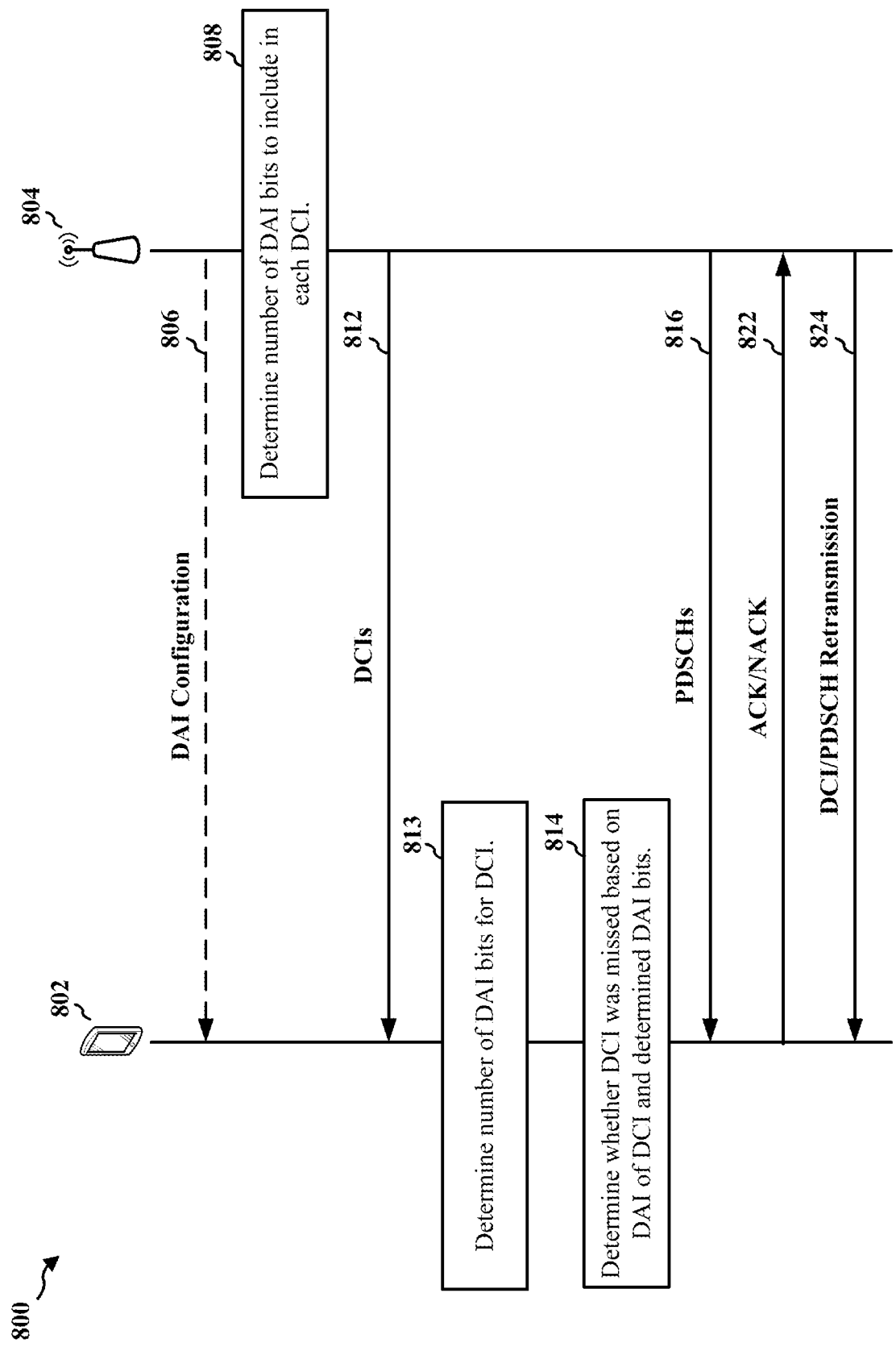
FIG. 8 is a communication flow diagram illustrating a downlink scheduling and feedback procedure with variable DAI bitwidth.

FIG. 8 is a communication flow diagram illustrating a downlink scheduling and feedback procedure 800 with variable DAI bitwidth. A base station 804 may be scheduling a UE 802 to receive PDSCHs from the base station 804, and may be configured to utilize joint scheduling DCI to schedule the PDSCHs. For example, the base station 804 may communicate with the UE 802 on two carriers through carrier aggregation and may be capable of transmitting a single DCI which schedules one PDSCH on each carrier.

The base station 804 may generate DCIS to schedule resources for PDSCHs to be transmitted to the UE 802. As illustrated at 808, the base station 804 may determine a number of DAI bits to include in each DCI. The base station 804 may use a base DAI bitwidth or may use one or more extended DAI bitwidth for a given DCI. In some aspects, the base DAI bitwidth may be two bits. In some aspects, the extended DAI bitwidth may be three or more bits. In some aspects, the extended DAI bitwidth may be four bits.

In some aspects, the base station 804 may use the extended DAI bitwidth for all DCIS upon determining that any of the DCIS are joint scheduling DCIS, may use the extended DAI bitwidth for all DCIS upon determining that any of the DCIS will have a DCI format that is capable of joint scheduling (for example, a DCI format which may schedule a single PDSCH and may also schedule multiple PDSCHs), or may use the extended DAI bitwidth for all DCIS upon determining that the base station 804 is configured to use joint scheduling for the UE 802 (for example, based on determining that the base station 804 is using carrier aggregation to communicate with the UE 802 on multiple carriers). Otherwise, the base station 804 may use the base DAI bitwidth for all DCIS.

In some aspects, the base station 804 may determine whether to use the extended DAI bitwidth or the base DAI bitwidth for a given DCI based on the DCI format of that DCI. In some aspects, the base station 804 may determine whether to use the extended DAI bitwidth or the base DAI bitwidth for a given DCI based on whether the DCI format of the DCI is capable of joint scheduling. In some aspects, the base station 804 may determine whether to use the extended DAI bitwidth or the base DAI bitwidth for a given DCI based on what carrier the DCI will be transmitted on. FIGS. 10, 11, 12, and 13 provide some examples of a base station determining the number of DAI bits to include in a DCI based on various criteria.

Upon generating the DCIS with the determined bitwidths, the base station 804 may transmit the DCIS 812 to the UE 802. The base station 804 may transmit the DCIS 812 in PDCCHs at PDCCH monitoring occasions. The UE 802 may perform blind monitoring of the PDCCH monitoring occasions, may decode any PDCCH received during a PDCCH monitoring occasion, and may determine whether the received PDCCH contains a DCI for the UE 802.

Upon receiving a DCI from the base station 804, the UE 802 may determine a number of DAI bits for the DCI as illustrated at 813. The UE 802 may determine the number of DAI bits for the DCI based on the method used by the base station 804 to determine the number of bits to use for each DAI at 808. In some aspects, the UE 802 may be preconfigured with information on the method the base station 804 will use to determine the number of DAI bits. In some aspects, the base station 804 may transmit a DAI configuration 806 to the UE 802 which includes information on the method the base station 804 will use to determine the number of DAI bits, and the UE 802 may determine the number of DAI bits for a DCI based on the DAI configuration 806. In some aspects, the base station 804 may transmit information on the method used to determine the DAI bits after or contemporaneously with determining the number of DAI bits at 808.

Figure 9:
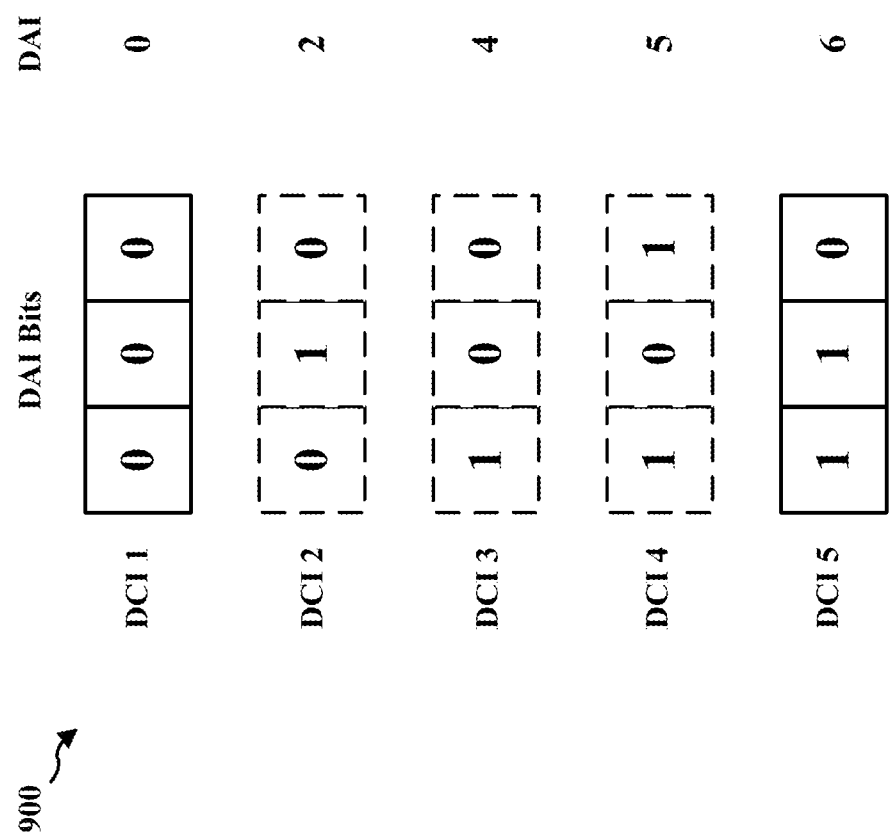
FIG. 9 is a diagram illustrating a DAI procedure with variable DAI bitwidth.

As illustrated at 814, after determining the number of DAI bits for a DCI, the UE 802 may determine whether the UE 802 missed a DCI from the base station 804 based on the DAI bits of a received DCI and the number of DAI bits for the received DCI determined at 813. The UE 802 may determine a DAI value corresponding to the DAI bits based on the number of DAI bits and may compare the DAI value to the values for other received DCI (for example, the DCI received immediately before or the DCI received immediately after) to determine if any values were skipped, indicating a missed DCI. FIG. 9 provides an example of this DAI procedure.

FIG. 9 is a diagram illustrating a DAI procedure 900 with variable DAI bitwidth. A base station may transmit DCI 1, DCI 2, DCI 3, DCI 4, and DCI 5 to a UE, in that order. DCI 2 and DCI 3 may be joint scheduling DCIS, each scheduling two PDSCHs. DCI 1, DCI 4, and DCI 5 may each schedule a single PDSCH.

The base station may determine to generate DCI 1, DCI 2, DCI 3, DCI 4, and DCI 5 with an extended DAI bitwidth; in the example illustrated in FIG. 9, the extended bitwidth may be three bits. Based on having a bitwidth of three, the DAI bits may generated using a modulo eight operation (for example, a DAI value of two and a DAI value of ten would both correspond to bits representing a value of two: 0, 1, and 0).

DCI 1 may schedule a PDSCH with a DAI value of zero. Because DCI 2 schedules two PDSCHs, its DAI bits may be based on a DAI value of two—two higher than the DAI value used for the DAI bits of DCI 1. Similarly, because DCI 3 schedules two PDSCHs, its DAI bits may be based on a DAI value of four. DCI 4 and DCI 5 each schedule one PDSCH, so their DAI bits may be based on a DAI value of five and a DAI value of six, respectively.

The UE receiving DCI 1, DCI 2, DCI 3, DCI 4, and DCI 5 from the base station may determine that these DCIS were generated with the extended bitwidth of three, and may determine missed DCIS based on the extended bitwidth. For example, the UE may receive DCI 1 and DCI 5 from the base station, but may miss DCI 2, DCI 3, and DCI 4. The UE may compare the DAI bits of DCI 1 to the DAI bits of the next received DCI, DCI 5. The DAI bits of DCI 1 (0, 0, and 0) represent a value of zero, and the DAI bits of DCI 5 (1, 1, and 0) represent a value of six. Based on the jump in the value corresponding to the DAI bits, the UE may determine that it missed DCIS scheduling five PDSCHs. The UE 802 may not receive PDSCHs scheduled by DCIS that the UE 802 missed. The UE 802 may attempt to decode the received PDSCHs.

Referring again to FIG. 8, the base station 804 may transmit PDSCHs 816 to the UE 802 on the PDSCH resources scheduled in the DCIS 812. The UE 802 may monitor the PDSCH resources identified in DCIS of the DCIS 812 which it successfully received to receive the PDSCHs transmitted on those resources.

Because the DAI values are associated with the PDSCHs and the DCIS scheduling multiple PDSCHs have DAI bit values representing an increase of two over the preceding DCIS, the UE 802 may accurately determine the number of PDSCHs scheduled by the missed DCIS without determining how many DCIS were miss or whether they scheduled one or more PDSCH. Because the DCIS were generated with the extended DAI bitwidth (for example, a three or more bits), the UE 802 can make the determination of missed DCIS and the number of missed scheduled PDSCHs accurately after a larger number of consecutive missed DCIS than would be possible with the base DAI bitwidth (for example, two bits).

The UE 802 may generate ACK/NACK feedback 822 based on the received PDSCHs and the missed DCIS. The UE may generate ACK bits for the PDSCHs received and decoded successfully, may generate NACK bits for the PDSCHs received but not decoded successfully, and may generate NACK bits for PDSCHs of missed DCIS. The UE 802 may transmit the ACK/NACK feedback 822 to the base station 804. The base station 804 may determine to retransmit some or all of the PDSCHs for which it received corresponding NACK feedback, and may transmit DCI scheduling a retransmission of the missed PDSCH or PDSCHs and retransmit the PDSCH or PDSCHs as illustrated at 824.

Figure 10:
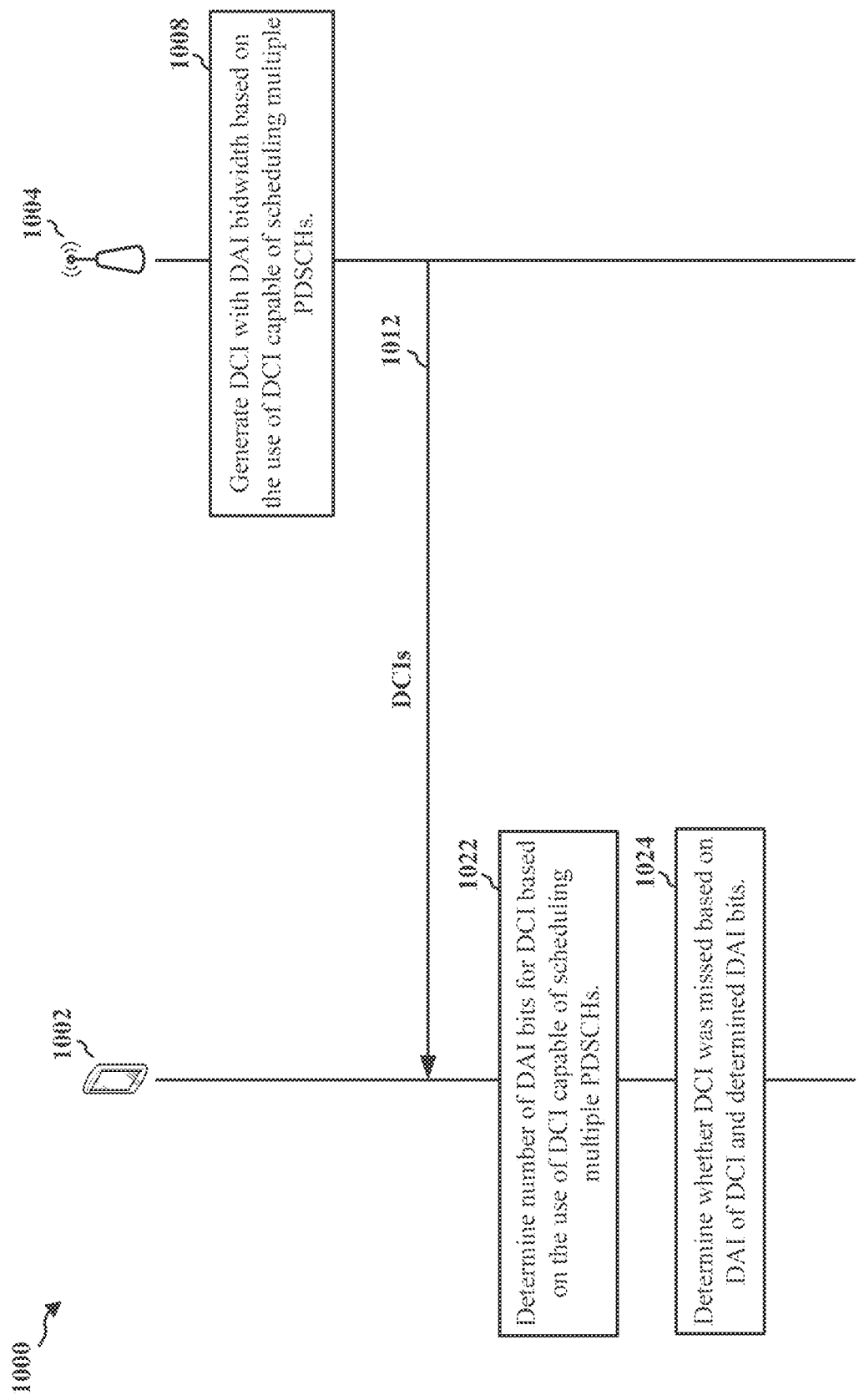
FIG. 10 is a communication flow diagram illustrating a downlink scheduling and feedback procedure with DAI bitwidth set based on whether joint scheduling downlink control information (DCI) is used.

FIG. 10 is a communication flow diagram illustrating a downlink scheduling and feedback procedure 1000 with DAI bitwidth set based on whether joint scheduling DCI is used. A base station 1004 may be scheduling a UE 1002 to receive PDSCHs from the base station 1004.

As illustrated at 1008, the base station 1004 may generate DCI scheduling the PDSCHs to be transmitted to the UE 1002. The base station 1004 may generate the DCIS with the base DAI bitwidth or with the extended DAI bitwidth based on the use of DCI capable of scheduling multiple PDSCHs with respect to the UE 1002.

In some aspects, at 1008, the base station 1004 may determine whether the configuration of its communication with the UE 1002 allows for the use of DCI capable of scheduling multiple PDSCHs. For example, the base station 1004 may determine whether it will communicate with the UE 1002 using carrier aggregation, may determine if it will communicate with the UE 1002 using a PCell, PSCell, or SCell configured to utilize joint scheduling, or may determine if the UE 1002 supports joint scheduling. If the configuration of its communication with the UE 1002 does allow for the use of DCI capable of scheduling multiple PDSCHs, the base station 1004 may generate all of the DCIS with the extended DAI bitwidth. If not, the base station 1004 may generate all of the DCIS with the base DAI bitwidth.

In some aspects, at 1008, the base station 1004 may determine whether any of the DCIS it is generating are capable of scheduling multiple PDSCHs. For example, the base station 1004 may determine whether any of the DCIS has a DCI format which may schedule resources for multiple PDSCHs. A DCI may be able to schedule a single PDSCH or multiple PDSCHs, and the base station 1004 may determine that such a DCI is capable of scheduling multiple PDSCHs even if the DCI only schedules one PDSCH. If one or more of the DCIS generated by the base station 1004 is capable of scheduling multiple PDSCHs, the base station 1004 may generate all of the DCIS with the extended DAI bitwidth. If not, the base station 1004 may generate all of the DCIS with the base DAI bitwidth.

In some aspects, at 1008, the base station 1004 may determine whether any of the DCIS it is generating identifies scheduled resources for multiple PDSCHs. If one or more of the DCIS schedules multiple PDSCHs, the base station 1004 may generate all of the DCIS with the extended DAI bitwidth. If not, the base station 1004 may generate all of the DCIS with the base DAI bitwidth.

The base station 1004 may transmit the DCIS 1012 to the UE 1002. As illustrated at 1022, the UE 1002 may determine a number of DAI bits for received DCI based on the use of DCI capable of scheduling multiple PDSCHs. In some aspects, the UE 1002 may determine that the DCI has the extended DAI bitwidth if the configuration of its communication with the base station 1004 allows for the use of DCI capable of scheduling multiple PDSCHs. In some aspects, the UE 1002 may determine that the DCI has the extended DAI bitwidth if the UE 1002 receives a DCI capable of scheduling multiple PDSCHs (for example, DCI having a DCI format capable of scheduling a single PDSCH or scheduling multiple PDSCHs). In some aspects, the UE 1002 may determine that the DCI has the extended bitwidth if the UE 1002 receives a DCI which schedules multiple PDSCHs. Otherwise, the UE 1002 may determine that the DCI has the base DAI bitwidth.

As illustrated at 1024, the UE 1002 may determine whether it missed one or more DCI from the base station 1004 based on the DAI of a received DCI and the determined number of DAI bits of the received DCI. For example, the UE 1002 may determine whether it missed any DCI as described below with respect to FIG. 15.

Figure 11:
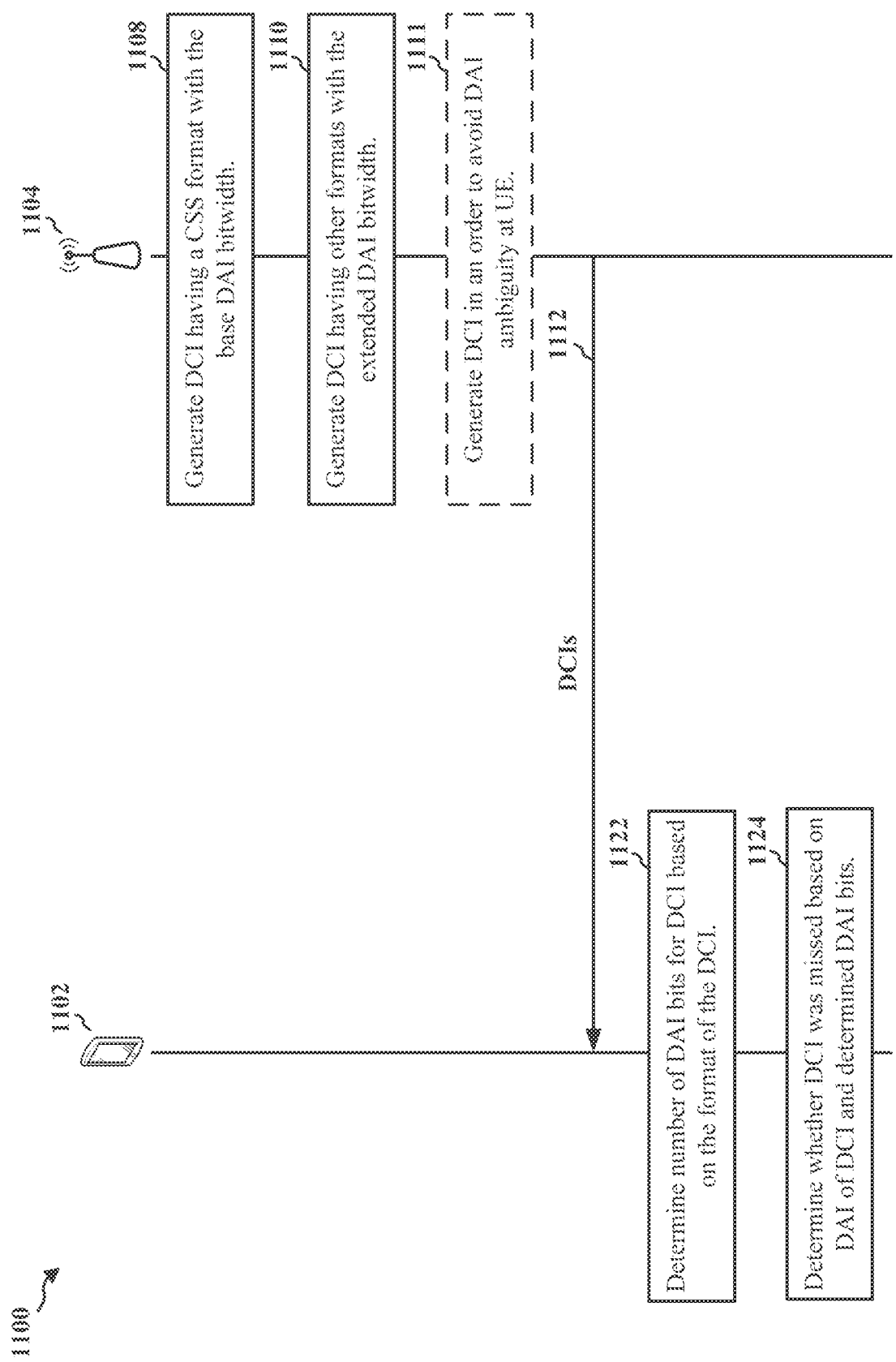
FIG. 11 is a communication flow diagram illustrating a downlink scheduling and feedback procedure with DAI bitwidth set based on DCI format.

FIG. 11 is a communication flow diagram illustrating a downlink scheduling and feedback procedure 1100 with DAI bitwidth set based on DCI format. A base station 1104 may be scheduling a UE 1102 to receive PDSCHs from the base station 1104.

The base station 1104 may generate DCIS scheduling the PDSCHs for the UE 1102. As illustrated at 1108, the base station 1104 may generate one or more DCIS monitored in a common search space (CSS) set. A CSS format may be a DCI format for DCI transmitted on the CSS. For example, the CSS format may be DCI Format 1_0. In some aspects, a CSS format may be a DCI format for DCI transmitted on the CSS or a UE-specific search space (USS). A size of DCI transmitted on the CSS may have not be configurable by a specific UE or may only be configurable by a specific UE under limited circumstances. For example, DCI characteristics such as the size of the DCI may not be configurable or may have limited options for configuration to provide for sharing of the CSS set by a number of devices. In some aspects, the size of DCI transmitted on the CSS for scheduling a PDSCH for a UE may have the same size as a DCI scheduling system information. Increasing a DAI bitwidth of a DCI with a CSS format may change the size of the DAI in a manner incompatible with transmission on the CSS set. The base station 1104 may generate the one or more DCIS with the CSS format with the base DAI bitwidth.

As illustrated at 1110, the base station 1104 may generate one or more DCIS that does not have a CSS format (for example, a DCI with a DCI format that is not transmitted on the CSS, or a DCI with a DCI format other than DCI Format 1_0). The base station 1104 may generate the one or more DCIS that do not have a CSS format with the extended DAI bitwidth.

In some aspects, at 1111, the base station 1104 may generate the DCI at 1108 and 1110 such that the DCI has an order that avoids DAI ambiguity at the UE 1102. In some aspects, for a given HARQ-ACK codebook, where the base station generates a DCI having a CSS format with the base DAI bitwidth, the base station may not generate a DCI having the extended bitwidth which will result in ACK/NACK feedback on the same PUCCH resource as the ACK/NACK feedback for the DCI having the CSS format. In some aspects, if the base station 1104 generates a first DCI having a CSS format with the base DAI bitwidth and generates a second DCI, which immediately follows the first DCI and does not have a CSS format, with the extended DAI bitwidth, the base station 1104 may generate a third DCI, which immediately follows the second DCI, with a format that is not a CSS format and with the extended bitwidth.

The base station 1104 may transmit the DCIS 1112 to the UE 1102. As illustrated at 1122, the UE 1102 may determine a number of DAI bits for received DCI based on the format of the DCI. The UE 1102 may determine that the DCI has the extended DAI bitwidth if the DCI has a CSS format (for example, DCI Format 1_0). The UE 1102 may determine that the DCI has the base DAI bitwidth if the DCI does not have a CSS format (for example, has a format other than DCI Format 1_0).

As illustrated at 1124, the UE 1102 may determine whether it missed one or more DCI from the base station 1104 based on the DAI of a received DCI and the determined number of DAI bits of the received DCI. For example, the UE 1102 may determine whether it missed any DCI as described below with respect to FIG. 15.

Figure 12:
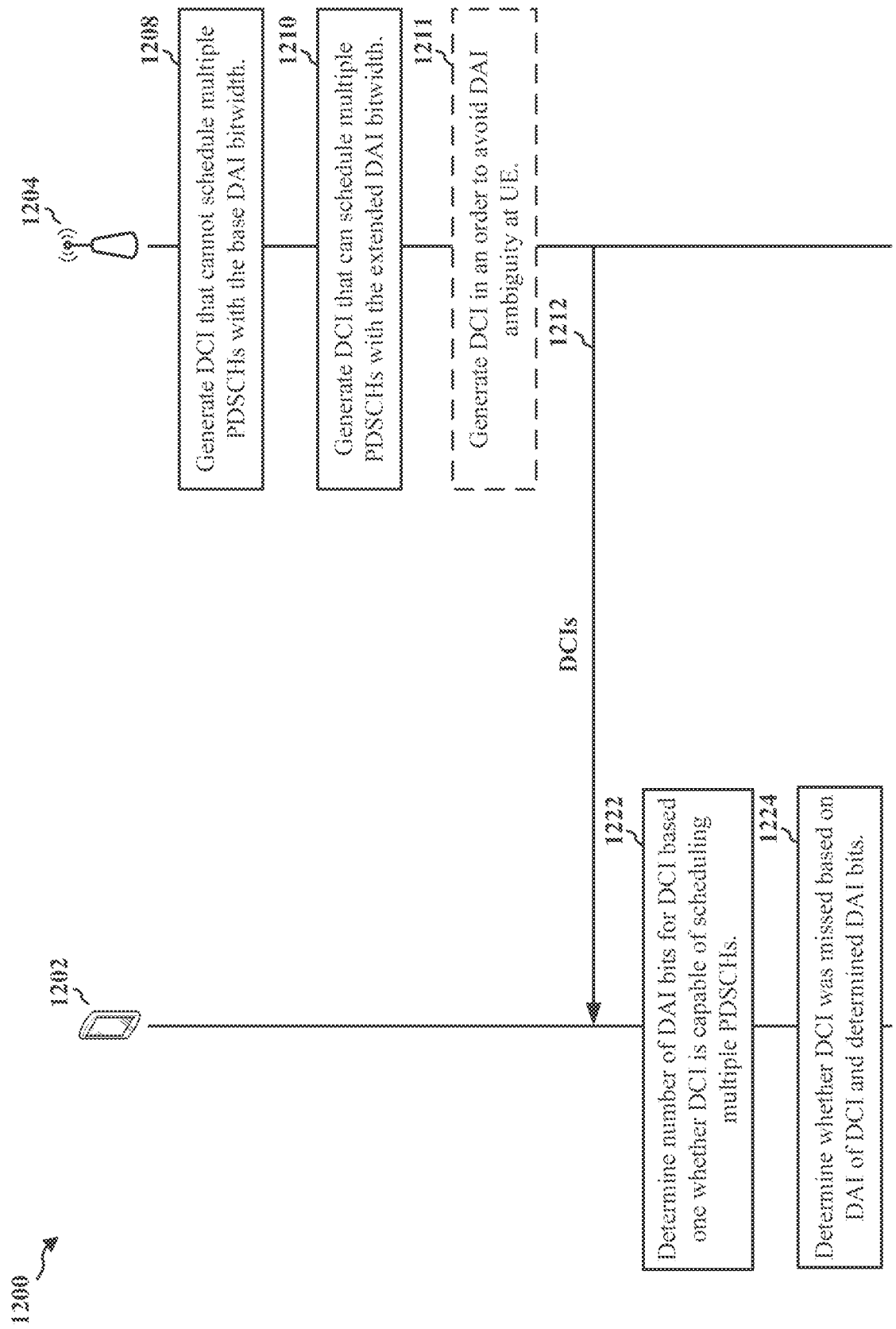
FIG. 12 is a communication flow diagram illustrating a downlink scheduling and feedback procedure with DAI bitwidth set based on DCI format.

FIG. 12 is a communication flow diagram illustrating a downlink scheduling and feedback procedure 1200 with DAI bitwidth set based on DCI format. A base station 1204 may be scheduling a UE 1202 to receive PDSCHs from the base station 1204.

The base station 1204 may generate DCIS scheduling the PDSCHs for the UE 1202. As illustrated at 1208, the base station 1204 may generate one or more DCIS that cannot schedule multiple PDSCHs. For example, the base station 1204 may generate one or more DCIS having a format that is only capable of scheduling a single PDSCH. The base station 1204 may generate the one or more DCIS that cannot schedule multiple PDSCHs with the base DAI bitwidth.

As illustrated at 1210, the base station 1204 may generate one or more DCIS that can schedule multiple PDSCHs. For example, the base station 1204 may generate one or more DCIs having a format or formats capable of scheduling one PDSCH and capable of scheduling multiple PDSCHs, or having a format or formats only capable of scheduling multiple PDSCHs. In some aspects, based on the DCIS having DCI formats capable of scheduling multiple PDSCHs, the number of ACK bits transmitted by the UE 1202 in response to the PDSCH or PDSCHs scheduled by the DCIS may be a number adequate to provide ACK for multiple PDSCHs, even if the DCI only schedules a single PDSCH. The base station 1204 may generate the one or more DCIS that can schedule multiple PDSCHs with the extended DAI bitwidth.

In some aspects, at 1211, the base station 1204 may generate the DCI at 1208 and 1210 such that the DCI has an order that avoids DAI ambiguity at the UE 1202. For example, if the base station 1204 generates a first DCI that is not capable of scheduling multiple PDSCHs with the base DAI bitwidth and generates a second DCI, which immediately follows the first DCI and is capable of scheduling multiple PDSCHs, with the extended DAI bitwidth, the base station 1204 may generate a third DCI, which immediately follows the second DCI, that is capable of scheduling multiple PDSCHs and with the extended bitwidth.

The base station 1204 may transmit the DCIS 1212 to the UE 1202. As illustrated at 1222, the UE 1202 may determine a number of DAI bits for received DCI based one whether DCI is capable of scheduling multiple PDSCHs. The UE 1202 may determine that the DCI has the extended DAI bitwidth if the DCI is capable of scheduling multiple PDSCHs. The UE 1202 may determine that the DCI has the base DAI bitwidth if the DCI is not capable of scheduling multiple PDSCHs.

As illustrated at 1224, the UE 1202 may determine whether it missed one or more DCI from the base station 1204 based on the DAI of a received DCI and the determined number of DAI bits of the received DCI. For example, the UE 1202 may determine whether it missed any DCI as described below with respect to FIG. 15.

Figure 13:
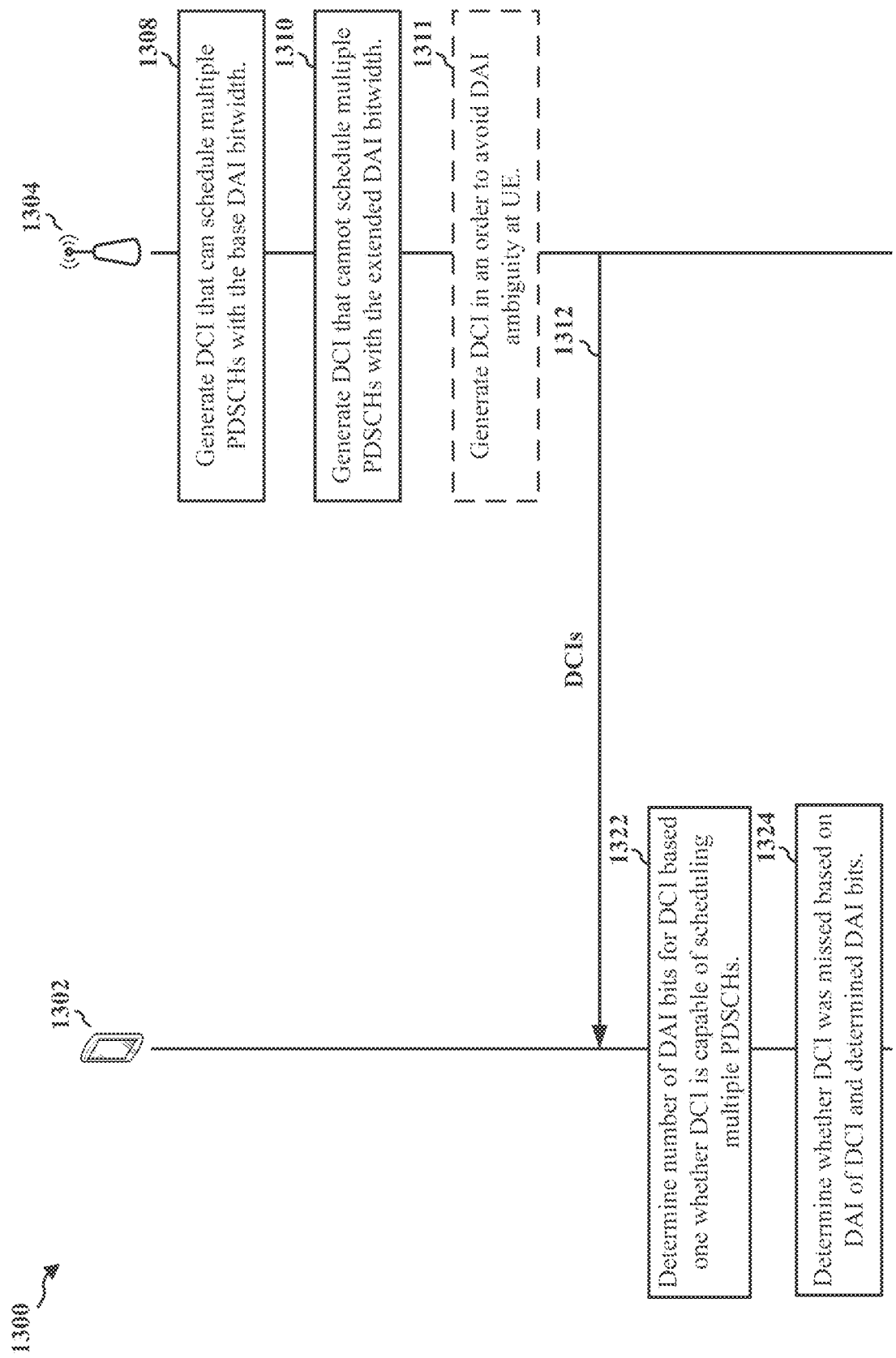
FIG. 13 is a communication flow diagram illustrating a downlink scheduling and feedback procedure with DAI bitwidth set based on DCI format.

FIG. 13 is a communication flow diagram illustrating a downlink scheduling and feedback procedure 1300 with DAI bitwidth set based on DCI format. A base station 1304 may be scheduling a UE 1302 to receive PDSCHs from the base station 1304.

The base station 1304 may generate DCIS scheduling the PDSCHs for the UE 1302. As illustrated at 1308, the base station 1304 may generate one or more DCIS that can schedule multiple PDSCHs. For example, the base station 1304 may generate one or more DCIs having a format or formats capable of scheduling one PDSCH and capable of scheduling multiple PDSCHs, or having a format or formats only capable of scheduling multiple PDSCHs. The base station 1304 may generate the one or more DCIS that can schedule multiple PDSCHs with the base DAI bitwidth.

As illustrated at 1310, the base station 1304 may generate one or more DCIS that cannot schedule multiple PDSCHs. For example, the base station 1304 may generate one or more DCIS having a format that is only capable of scheduling a single PDSCH. The base station 1304 may generate the one or more DCIS that cannot schedule multiple PDSCHs with the extended DAI bitwidth.

As illustrated above with respect to FIG. 7, where a UE misses two consecutive DCIS scheduling multiple PDSCHs and the DCIS before and after the missed DCIS each have two DAI bits, the UE may not determine that it missed a DAI. Although DCI 2 and DCI 3 of FIG. 7, the DCIS scheduling multiple PDSCHs, are illustrated with two DAI bits each, the result may be the same if they had a larger number of DAI bits because the modulo operation would result in the same DAI bits for DCI 1 and DCI 4. To avoid this, in some aspects, the DCIS that schedule a single PDSCH may be generated with the extended DAI bitwidth, and the DCIS that schedule multiple PDSCHs may be generated with the base DAI bitwidth.

Referring again to FIG. 13, in some aspects, at 1311, the base station 1304 may generate the DCI at 1308 and 1310 such that the DCI has an order that avoids DAI ambiguity at the UE 1302. For example, if the base station 1304 generates a first DCI that can schedule multiple PDSCHs with the base DAI bitwidth and generates a second DCI, which immediately follows the first DCI and cannot schedule multiple PDSCHs, with the extended DAI bitwidth, the base station 1304 may generate a third DCI, which immediately follows the second DCI, with a format that cannot schedule multiple PDSCHs and with the extended bitwidth.

The base station 1304 may transmit the DCIS 1312 to the UE 1302. As illustrated at 1322, the UE 1302 may determine a number of DAI bits for received DCI based one whether DCI is capable of scheduling multiple PDSCHs. The UE 1302 may determine that the DCI has the extended DAI bitwidth if the DCI cannot schedule multiple PDSCHs. The UE 1302 may determine that the DCI has the base DAI bitwidth if the DCI can schedule multiple PDSCHs.

As illustrated at 1324, the UE 1302 may determine whether it missed one or more DCI from the base station 1304 based on the DAI of a received DCI and the determined number of DAI bits of the received DCI.

Figure 14:
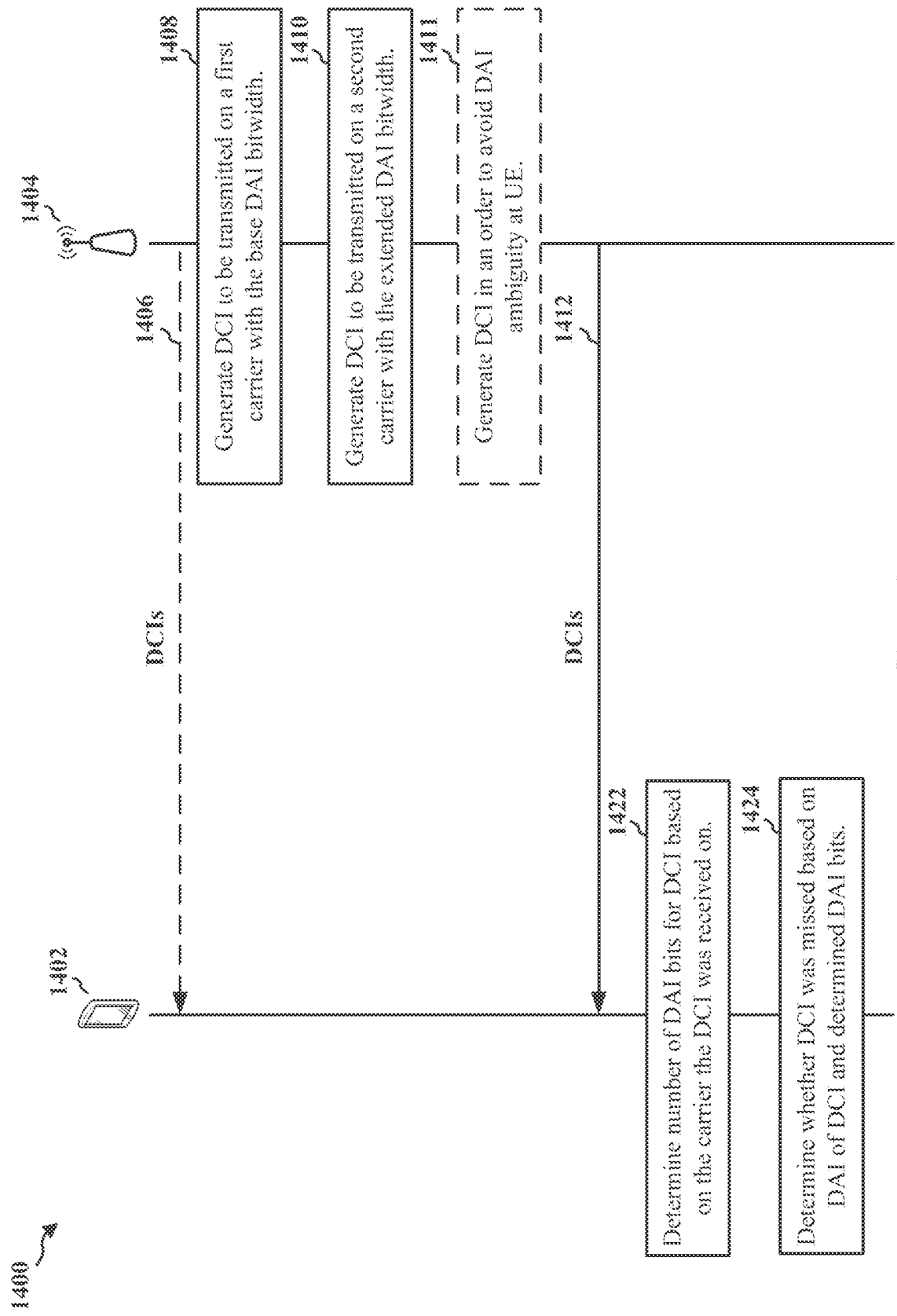
FIG. 14 is a communication flow diagram illustrating a downlink scheduling and feedback procedure with DAI bitwidth set based on a carrier for the DCI.

FIG. 14 is a communication flow diagram illustrating a downlink scheduling and feedback procedure 1400 with DAI bitwidth set based on a carrier for the DCI. A base station 1404 may be scheduling a UE 1402 to receive PDSCHs from the base station 1404. The base station 1404 may communicate with the UE 1402 on a first carrier and a second carrier (for example, using carrier aggregation), and may transmit DCIS on the first carrier and the second carrier.

The base station 1404 may generate DCIS scheduling the PDSCHs for the UE 1402. As illustrated at 1408, the base station 1404 may generate one or more DCIS to be transmitted to the UE 1402 on the first carrier. The base station may generate the one or more DCIS to be transmitted on the first carrier with the base DAI bitwidth.

As illustrated at 1410, the base station 1404 may generate one or more DCIS to be transmitted to the UE 1402 on the second carrier. The base station 1404 may generate the one or more DCIS to be transmitted on the second carrier with the extended DAI bitwidth.

In some aspects, at 1411, the base station 1404 may generate the DCI at 1408 and 1410 such that the DCI has an order that avoids DAI ambiguity at the UE 1402. For example, if the base station 1404 generates a first DCI to be transmitted on the first carrier with the base DAI bitwidth and generates a second DCI, which immediately follows the first DCI and which will be transmitted on the second carrier, with the extended DAI bitwidth, the base station 1404 may generate a third DCI, which immediately follows the second DCI, to be transmitted on the second carrier and with the extended bitwidth.

The base station 1404 may transmit the DCIS 1412 to the UE 1402. As illustrated at 1422, the UE 1402 may determine a number of DAI bits for received DCI based on the carrier the DCI was received on. For example, in some aspects, the base station 1404 may transmit an RRC configuration message 1406 to the UE 1402 indicating that DCIS transmitted on the second carrier may have the extended DAI bitwidth or that DCIS transmitted on the first carrier may have the base DAI bitwidth. The UE 1402 may determine that the DCI has the extended DAI bitwidth if the DCI is received on the second carrier. The UE 1402 may determine that the DCI has the base DAI bitwidth if the DCI is received on the first carrier.

As illustrated at 1424, the UE 1402 may determine whether it missed one or more DCI from the base station 1404 based on the DAI of a received DCI and the determined number of DAI bits of the received DCI. For example, the UE 1402 may determine whether it missed any DCI as described below with respect to FIG. 15.

FIG. 15 is a diagram illustrating a DAI procedure 1500 with mixed DAI bitwidths. A base station may transmit DCI 1, DCI 2, DCI 3, DCI 4, and DCI 5 to a UE in that order. DCI 1 and DCI 4 may have a base DAI bitwidth of two bits, and DCI 2, DCI 3, and DCI 5 may have an extended DAI bitwidth of three bits. In some aspects, DCI 1 and DCI 4 may have a CSS format such as DCI Format 1_0 and DCI 2, DCI 3, and DCI 5 may not have a CSS format (for example, as described with respect to FIG. 11). In some aspects, DCI 1 and DCI 4 may not be able to schedule multiple PDSCHs and DCI 2, DCI 3, and DCI 5 may be able to schedule multiple PDSCHs (for example, as described with respect to FIG. 12). In some aspects, DCI 1 and DCI 4 may be transmitted on one carrier and DCI 2, DCI 3, and DCI 5 be transmitted on a different carrier (for example, as described with respect to FIG. 14).

DCI 1 may schedule a PDSCH with a DAI of zero. DCI 2 may schedule two PDSCHs with DAI values of one and two. DCI 3 may schedule two PDSCHs with DAI values of three and four. DCI 4 may schedule one PDSCH with a DAI value of five. DCI 5 may schedule one PDSCH with a DAI value of six.

The UE may receive DCI 1 and may determine that DCI 1 has the base DAI bitwidth of two bits. The UE may determine that the 0, 0 bit values of DCI 1 correspond to a DAI value of zero.

The UE may receive DCI 2 and may determine that DCI 2 has the extended DAI bitwidth of three bits. The UE may determine that the 0, 1, 0 bit values of DCI 2 correspond to a DAI value of two. The UE may determine that DCI 2 schedules two PDSCHs. If the UE determined the DAI value of zero for DCI 1, then the UE can determine that no DCI was missed between DCI 1 and DCI 2 based on the DAI value increasing by two, as expected based on the two PDSCHs scheduled by DCI 2. Otherwise, the UE may determine that it missed a DCI prior to DCI 2 which scheduled one PDSCH.

The UE may receive DCI 3 and may determine that DCI 3 has the extended DAI bitwidth of three bits. The UE may determine that the 1, 0, 0 bit values of DCI 3 correspond to a DAI value of four. The UE may determine that DCI 3 schedules two PDSCHs. If the UE determined the DAI value of two for DCI 2, then the UE can determine that no DCI was missed between DCI 2 and DCI 3 based on the DAI value increasing by two, as expected based on the two PDSCHs scheduled by DCI 3. If the UE missed DCI 2 but determined the DAI value of 0 for DCI 1, then the UE may determine that it missed one or more DCI between DCI 1 and DCI 3 which scheduled two PDSCHs. If the UE has not received any previous DCIs, the UE may determine that it missed one or more DCI scheduling three PDSCHs.

The UE may receive DCI 4 and may determine that DCI 4 has the base DAI bitwidth of two bits. The UE may determine that the 0, 1 bit values of DCI 4 correspond to a value of one. Because DCI 4 has a bitwidth of two, the UE may determine that the DAI bits represent the DAI value based on a modulo 4 operation. If the UE determined the DAI value of DCI 2 or DCI 3, the UE may determine that the DAI count has already progressed to two or four, respectively, and may determine the DAI value of DCI 4 to be the next DAI value with a modulo 4 value of one. The UE may therefore determine that the DAI value of DCI 4 is five. If the UE determined the DAI value of four for DCI 3, the UE may determine that it did not miss a DCI between DCI 3 and DCI 4. If the UE missed DCI 3 but determined the DAI value of two for DCI 2, the UE may determine that it missed one or more DCIS scheduling two PDSCHs.

The UE may receive DCI 5 and may determine that DCI 5 has the extended DAI bitwidth of three bits. The UE may determine that the 1, 1, 0 bit values of DCI 5 correspond to a value of six. Because DCI 5 has a bitwidth of three, the UE may determine that the DAI bits represent the DAI value based on a modulo 8 operation. Because the UE has not received any DCI with a DAI value of eight or more, the UE may determine that the DAI value of DCI 5 is six. If the UE determined the DAI value of five for DCI 4, the UE may determine that it did not miss any DCI between DCI 4 and DCI 5. If the UE missed DCI 4 but determined the DCI value of four for DCI 3, the UE may determine that it missed a DCI scheduling one PDSCH. If the UE missed DCI 4 and DCI 3 but determined the DAI value of two for DCI 2, the UE may determine that it missed one or more DCI scheduling three PDSCHs. If the UE missed DCI 2, DCI 3, and DCI 4 but determined the DAI value of zero for DCI 1, the UE may determine that it missed one or more DCI scheduling five PDSCHs. If the UE has not received any previous DCI, the UE may determine that it missed one or more DCI scheduling five PDSCHs.

Figure 16:
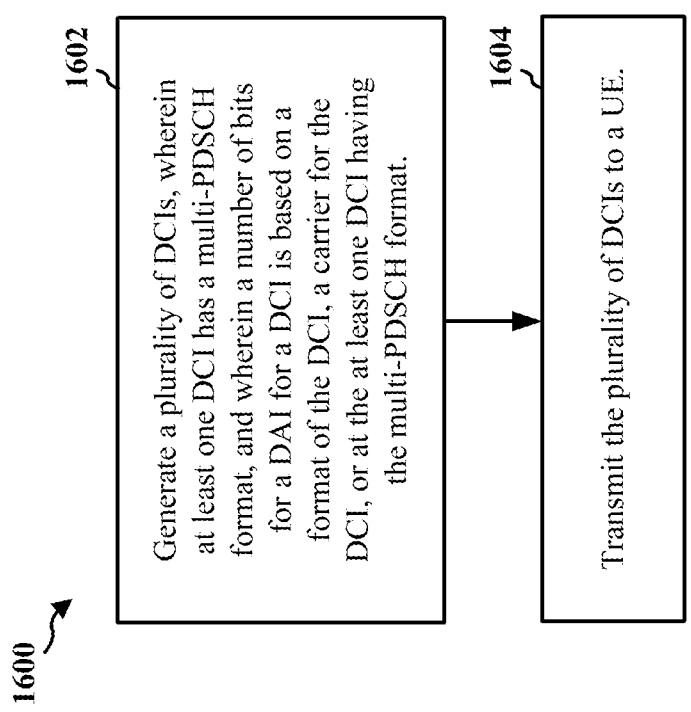
FIG. 16 is a flowchart of a method of wireless communication.

FIG. 16 is a flowchart of a method 1600 of wireless communication. The method 1600 may be performed by a base station (for example, the base station 102/180, 804, 1004, 1104, 1204, 1304, or 1404).

At 1602, the base station may generate a plurality of DCIS. The DCIS may identify PDSCH resources for a UE. A first DCI of the plurality of DCIS may have a multi-PDSCH format, which may be a format that can identify PDSCH resources for multiple PDSCHs. A number of bits for a downlink assignment index for a second DCI of the plurality of DCIS may be based on a format of the second DCI, based on a carrier for the second DCI, or based on the first DCI having the multi-PDSCH format.

In some aspects, the downlink assignment index for the second DCI may have an extended DAI bitwidth based on the first DCI having the multi-PDSCH format. For example, the downlink assignment index for the second DCI may have at least three bits based on the first DCI having the multi-PDSCH format.

Generating the plurality of DCIs may include determining a format for the second DCI, and the downlink assignment index for the second DCI may have a number of bits based on the format of the second DCI. The downlink assignment index for the second DCI may have a base DAI bitwidth based on the format of the second DCI being a common search space format or the downlink assignment index for the second DCI may have an extended bitwidth based on the format of the second DCI being a format other than the common search space format. For example, the downlink assignment index for the second DCI may have two bits based on the format of the second DCI being a common search space format or the downlink assignment index for the second DCI may have at least three bits based on the format of the second DCI being a format other than the common search space format.

Generating the plurality of DCIs may include determining a format for the second DCI of the plurality of DCIs, and the downlink assignment index for the second DCI may have a number of bits based on the format for the second DCI being the multi-PDSCH format. The downlink assignment index for the second DCI may have the extended DAI bitwidth based on the format for the second DCI being the multi-PDSCH format For example, the downlink assignment index for the second DCI may have at least three bits based on based on the format for the second DCI being the multi-PDSCH format. The downlink assignment index for the second DCI may have the extended DAI bitwidth based on the format for the second DCI being a format other than the multi-PDSCH format. For example, the downlink assignment index for the second DCI may have at least three bits based on the format for the second DCI being a format other than the multi-PDSCH format.

At 1604, the base station may transmit the plurality of DCIs to the UE.

The base station may transmit the plurality of DCIs on a first carrier and a second carrier. the downlink assignment index for the second DCI may have a number of bits based on whether the second DCI is transmitted on the first carrier or the second carrier. The downlink assignment index for the second DCI may have the extended DAI bitwidth based on the second DCI being transmitted on the first carrier or the downlink assignment index for the second DCI may have the base DAI bitwidth based on the second DCI being transmitted on the second carrier. For example, the downlink assignment index for the second DCI may have at least three bits based on the second DCI being transmitted on the first carrier or the downlink assignment index for the second DCI may have two bits based on the second DCI being transmitted on the second carrier. In some aspects, the base station may transmit a radio resource control message identifying the first carrier to the UE based on the second DCI being transmitted on the first carrier having the extended DAI bitwidth (for example, having at least three bits).

Transmitting the plurality of DCIs to the UE may include transmitting a first DCI, a second DCI, and a third DCI to the UE consecutively. For example, the base station may transmit a first DCI to the UE, transmit a second DCI to the UE after the first DCI, and transmit a third DCI to the UE after transmitting the second DCI, and the base station may not transmit any other DCI to the UE between the first DCI and the third DCI. In some aspects, the base station may generate the third DCI with the common search space format based on a format for the first DCI being the common search space format and a format for the second DCI being a format other than the common search space format. In some aspects, the base station may generate the third DCI with the multi- PDSCH format based on a format for the first DCI being a format other than the multi-PDSCH format and a format for a DCI of the second PDCCH being the multi-PDSCH format. In some aspects, the base station may generate the third DCI with a format other than the multi-PDSCH format based on a format for the first DCI being the multi-PDSCH format and a format for the second DCI being a format other than the multi-PDSCH format. In some aspects, wherein the base station may transmit the third DCI on the first carrier based on transmitting the first DCI on the second carrier and transmitting the second PDCCH on the first carrier.

Figure 17:
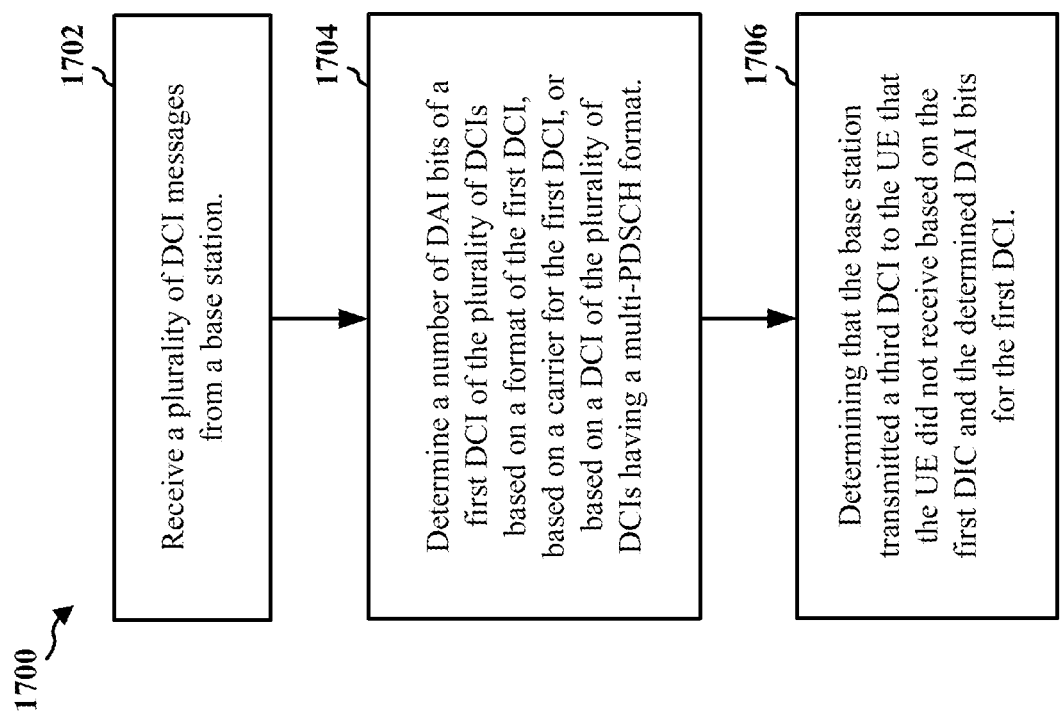
FIG. 17 is a flowchart of a method of wireless communication.

FIG. 17 is a flowchart of a method 1700 of wireless communication. The method 1700 may be performed by a UE (for example, the UE 104, 802, 1002, 1102, 1202, 1302, or 1402).

At 1702, the UE may receive a plurality of DCIs from a base station. The DCIs may identify PDSCH resources for the UE. The UE may receive the plurality of DCIs on a first carrier and on a second carrier.

At 1704, the UE may determine a number of downlink assignment index bits of a first DCI of the plurality of DCIs based on a format of the first DCI, based on a carrier for the first DCI, or based on a DCI of the plurality of DCIs having a multi-PDSCH format, the multi-PDSCH format being a format that can identify PDSCH resources for multiple PDSCHs. The number of downlink assignment index bits may be determined based on a DCI of the plurality of DCI formats having the multi-PDSCH format.

The number of downlink assignment index bits may be determined based on a format of the first DCI. The UE may determine that the first DCI has an extended DAI bitwidth for the downlink assignment index bits, such as three or more downlink assignment index bits, based on the first DCI having a common search space format. The UE may determine that the first DCI has the extended DAI bitwidth for the downlink assignment index bits, such as three or more downlink assignment index bits, based on the first DCI having the multi-PDSCH format. The UE may determine that the first DCI has the extended DAI bitwidth for the downlink assignment index bits, such as three or more downlink assignment index bits, based on the first DCI having a format other than the multi-PDSCH format.

The UE may determine that the first DCI has the extended DAI bitwidth for the downlink assignment index bits, such as three or more downlink assignment index bits, based on receiving the first DCI on the first carrier. The UE may receive an indicator identifying the first carrier from the base station, and the UE may determine that the first DCI has the extended DAI bitwidth for the downlink assignment index bits, such as three or more downlink assignment index bits, based on the indicator. The indicator may be received in a RRC message from a base station.

At 1706, the UE may determine that the base station transmitted a second DCI to the UE that the UE did not receive based on the first DCI and the determined number of DAI bits for the first DCI. The UE may determine that the base station transmitted the second DCI to the UE by at least comparing the downlink assignment index bits of the first DCI to downlink assignment index bits of a third DCI of the plurality of DCIs. The UE may receive the first DCI consecutively after the third DAI. For example, the UE may receive the third DCI before the first DCI and the UE may not receive another DCI between the third DCI and the first DCI. In some aspects, the UE may transmit a negative acknowledgment (NACK) based on the determination that the UE did not receive the third DCI.

The UE may determine the number of downlink assignment index bits of the first DCI to be two bits or to be three or more bits. The downlink assignment index bits of the first DCI may be based on a downlink assignment index value of the first DCI. The UE may determine that the base station transmitted the third DCI to the UE based on a modulus of the downlink assignment index modulo four based on determining the number of downlink assignment index bits of the first DCI to be two. The UE may determine that the base station transmitted the third DCI to the UE based on a modulus of the downlink assignment index modulo eight or more based on determining the number of downlink assignment index bits of the first DCI to be three or more. For example, the UE may determine that the base station transmitted the third DCI to the UE based on a modulus of the downlink assignment index modulo eight if the first DCI has three DAI bits, modulo 16 if the first DCI has four DAI bits, modulo 32 if the DCI has five DAI bits, etc.

Figure 18:
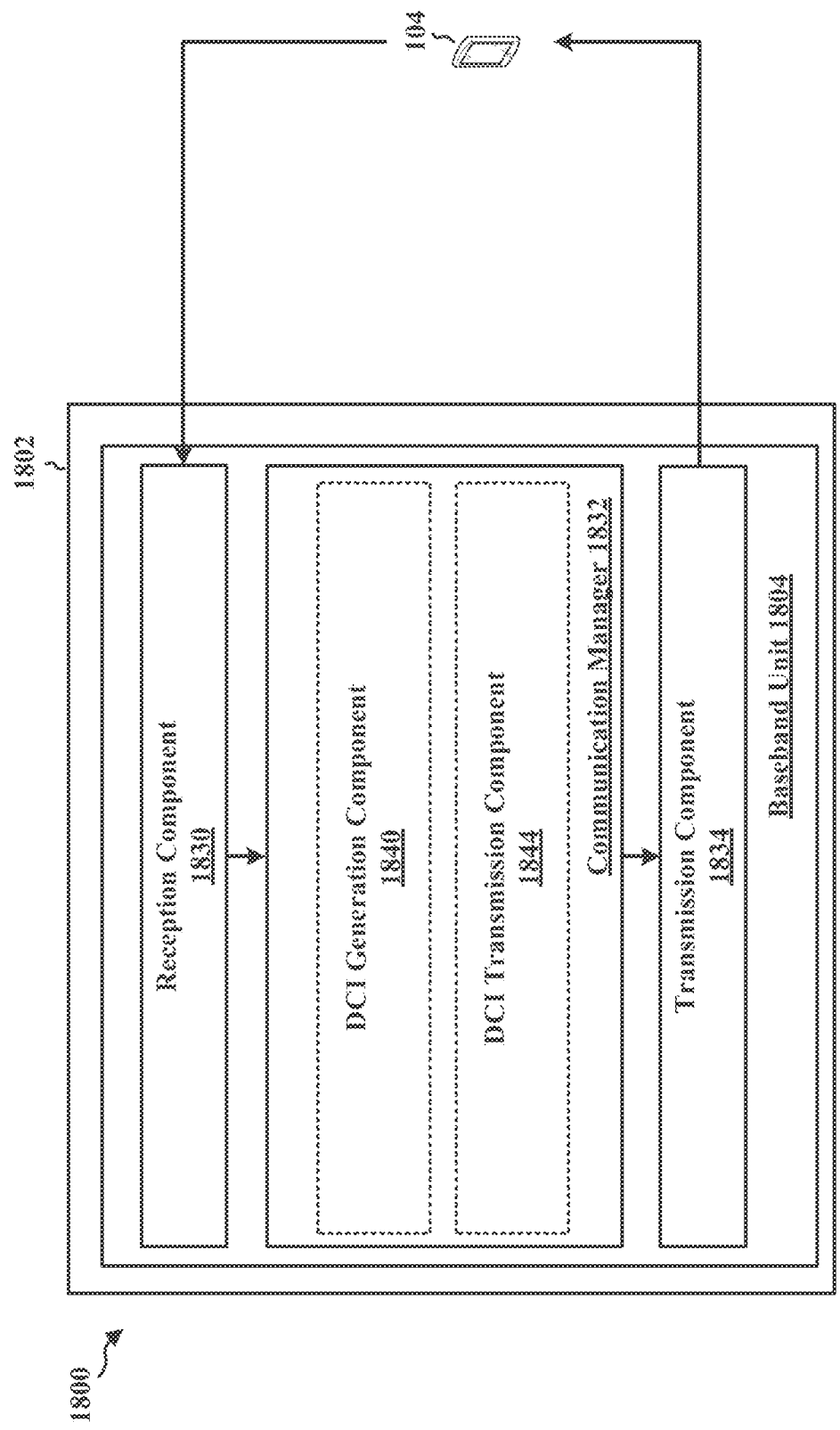
FIG. 18 is a diagram illustrating an example of a hardware implementation for an apparatus.

FIG. 18 is a diagram illustrating an example of a hardware implementation 1800 for an apparatus 1802. The apparatus 1802 may be a BS and includes a baseband unit 1804. The baseband unit 1804 may communicate through a cellular RF transceiver with the UE 104. The baseband unit 1804 may include a computer-readable medium/memory. The baseband unit 1804 is responsible for general processing, including the execution of software stored on the computer-readable medium/memory. The software, when executed by the baseband unit 1804, may cause the baseband unit 1804 to perform the various functions described above, for example, with respect to the base station 102/180, 804, 1004, 1104, 1204, 1304, or 1404. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the BS 310 and may include the memory 376 and/or at least one of the TX processor 316, the RX processor 370, and the controller/processor 375.

The communication manager 1832 includes a DCI generation component 1840 that generates a plurality of DCIs, for example, as described in connection with 1602 of FIG. 16. The DCI generation component 1840 may generate the plurality of DCIs to identify respective PDSCH resources for a user equipment. The DCI generation component 1840 may generate some or all of the plurality of DCIs with a multi-PDSCH format (for example, a format usable to identify PDSCH resources for multiple PDSCHs). The DCI generation component 1840 may generate a particular DCI of the plurality of DCIs with a number of bits for a DAI which is based on a format of the particular DCI, based on a carrier for the particular DCI, or based on the any of the plurality of DCIs having the multi-PDSCH format. The communication manager 1832 further includes a DCI transmission component 1844 that transmits the plurality of DCIs to the UE 104, for example, as described in connection with 1604 of FIG. 16. The DCI transmission component 1844 may receive the plurality of DCIs generated by the DCI generation component 1840 and transmit the DCIs to the UE 104 using the transmission component 1834.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for generating a plurality of DCIs, the DCIs identifying respective PDSCH resources for a UE, a first DCI of the plurality of DCIs having a multi-PDSCH format, the multi-PDSCH format being a format usable to identify PDSCH resources for multiple PDSCHs, a number of bits for a downlink assignment index for a second DCI of the plurality of DCIs being based on a format of the second DCI, based on a carrier for the second DCI, or based on the first DCI having the multi-PDSCH format. The apparatus 1802, and in particular the baseband unit 1804, may also include means for transmitting the plurality of DCIs to the UE. The aforementioned means may be one or more of the aforementioned components of the apparatus 1802 configured to perform the functions recited by the aforementioned means. As described above, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
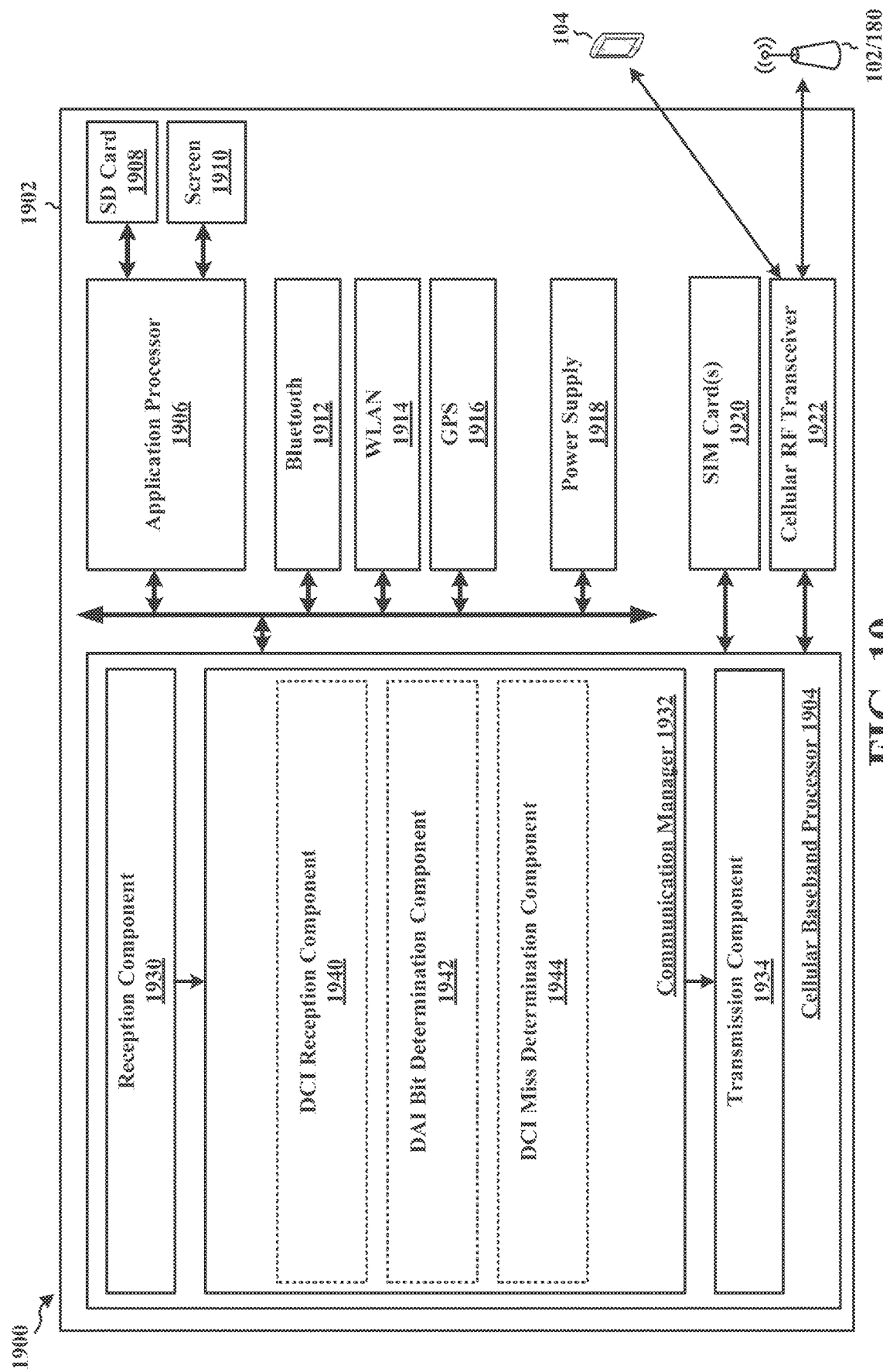
FIG. 19 is a diagram illustrating an example of a hardware implementation for an apparatus.

FIG. 19 is a diagram illustrating an example of a hardware implementation 1900 for an apparatus 1902. The apparatus 1902 may be a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described above, for example, for example, with respect to the UE 104, 802, 1002, 1102, 1202, 1302, or 1402. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (for example, see 350 of FIG. 3) and include the above-discussed additional modules of the apparatus 1902.

The communication manager 1932 includes a DCI reception component 1940 that is configured to receive a plurality of DCI from the base station 102/180, for example, as described in connection with 1702 of FIG. 7. The DCI reception component 1940 may receive a plurality of DCIs from the base station 102/180, for example, using reception component 1930. The DCIs may identify PDSCH resources for the UE. The communication manager 1932 further includes a DAI bit determination component 1942 that receives DCIS from the DCI reception component 1940 and is configured to determine a number of downlink assignment index bits of a first DCI of the plurality of DCIS based on a DCI of the plurality of DCIS having a multi-PDSCH format, the multi-PDSCH format being a format that can identify PDSCH resources for multiple PDSCHs, for example, as described in connection with 1704 of FIG. 17. The communication manager 1932 further includes a DCI miss determination component 1944 that receives DCIS from the DCI reception component 1940 and corresponding DAI bitwidths from the DAI bit determination component 1942, and is configured to determining that the base station transmitted a third DCI to the UE that the UE did not receive based on the first DCI and the determined number of DAI bits for the first DCI, for example, as described in connection with 1706 of FIG. 7.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving a plurality of DCIS from a base station, the DCIS identifying PDSCH resources for the UE; includes means for determining a number of downlink assignment index bits of a first DCI of the plurality of DCIS based on a format of the first DCI, based on a carrier for the first DCI, or based on a DCI of the plurality of DCIS having a multi-PDSCH format, the multi-PDSCH format being a format that can identify PDSCH resources for multiple PDSCHs; and includes means for determining that the base station transmitted a third DCI to the UE that the UE did not receive based on the first DCI and the determined number of DAI bits for the first DCI. The aforementioned means may be one or more of the aforementioned components of the apparatus 1902 configured to perform the functions recited by the aforementioned means. As described above, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, it the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, for example, "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
generating a plurality of downlink control information messages (DCIs), the DCIs identifying respective physical downlink shared channel (PDSCH) resources for a user equipment (UE), a first DCI of the plurality of DCIs having a first format usable to identify PDSCH resources for multiple PDSCHs, a number of bits for a downlink assignment index for a second DCI of the plurality of DCIs being based on at least one of a second format of the second DCI, a carrier on which the second DCI is transmitted, or the first DCI having the first format;
transmitting the plurality of DCIs to the UE; and
receiving a NACK from the UE when the UE does not receive the second DCI,
wherein the NACK is sent based on the UE determining that the base station transmitted the second DCI to the UE based on a modulus of the downlink assignment index modulo eight or more based on determining the number of downlink assignment index bits of the first DCI to be three or more.

2. The method of claim 1, wherein the downlink assignment index for the second DCI has at least three bits based on the first format of the first DCI being a multi-PDSCH format.

3. The method of claim 1, wherein the downlink assignment index for the second DCI has a number of bits based on the second format of the second DCI, and wherein the downlink assignment index for the second DCI has two bits based on the second format of the second DCI being a common search space format or at least three bits based on the second format of the second DCI being a format other than the common search space format.

4. The method of claim 3, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station generates the third DCI with the common search space format based on the first format for the first DCI being the common search space format and the second format for the second DCI being a format other than the common search space format.

5. The method of claim 1, wherein generating the plurality of DCIs comprises determining the second format for the second DCI, and wherein the downlink assignment index for the second DCI has a number of bits based on the second format for the second DCI being a multi-PDSCH format, and wherein the downlink assignment index for the second DCI has at least three bits based on the second format for the second DCI being the multi-PDSCH format, or wherein the downlink assignment index for the second DCI has at least three bits based on the second format for the second DCI being a format other than the multi-PDSCH format.

6. The method of claim 5, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station generates the third DCI with a multi-PDSCH format based on the first format for the first DCI being a format other than the multi-PDSCH format and a format for a DCI of the second PDCCH being the multi-PDSCH format.

7. The method of claim 6, wherein transmitting the plurality of DCIs to the UE comprises transmitting the first DCI to the UE, transmitting the second DCI to the UE after the first DCI, and transmitting the third DCI to the UE after transmitting the second DCI, wherein the base station does not transmit any other DCI to the UE between the first DCI and the third DCI, and wherein the base station generates the third DCI with a format other than the multi-PDSCH format based on the first format for the first DCI being the multi-PDSCH format and the second format for the second DCI being a format other than the multi-PDSCH format.

8. The method of claim 1, wherein the base station transmits the plurality of DCIs on a first carrier and a second carrier, and wherein the downlink assignment index for the second DCI has a number of bits based on whether the second DCI is transmitted on the first carrier or the second carrier, and wherein the downlink assignment index for the second DCI has at least three bits based on the second DCI being transmitted on the first carrier or the downlink assignment index for the second DCI has two bits based on the second DCI being transmitted on the second carrier.

9. The method of claim 8, further comprising:
transmitting a radio resource control message identifying the first carrier to the UE based on the second DCI being transmitted on the first carrier having at least three bits.

10. The method of claim 8, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station transmits the third DCI on the first carrier based on transmitting the first DCI on the second carrier and transmitting the second PDCCH on the first carrier.

11. An apparatus for wireless communication at a base station, comprising:
a memory; and
at least one processor coupled to the memory and configured to:
generate a plurality of downlink control information messages (DCIs), the DCIs identifying respective physical downlink shared channel (PDSCH) resources for a user equipment (UE), a first DCI of the plurality of DCIs having a first format usable to identify PDSCH resources for multiple PDSCHs, a number of bits for a downlink assignment index for a second DCI of the plurality of DCIs being based on a second format of the second DCI, based on a carrier for the second DCI, or based on the first DCI having the first format;
transmit the plurality of DCIs to the UE; and
receive a NACK from the UE when the UE does not receive the second DCI,
wherein the NACK is sent based on the UE determining that the base station transmitted the second DCI to the UE based on a modulus of the downlink assignment index modulo eight or more based on determining the number of downlink assignment index bits of the first DCI to be three or more.

12. The apparatus of claim 11, wherein the downlink assignment index for the second DCI has at least three bits based on the first format of the first DCI being a multi-PDSCH format.

13. The apparatus of claim 12, wherein the downlink assignment index for the second DCI has a number of bits based on the second format of the second DCI, and wherein the downlink assignment index for the second DCI has two bits based on the second format of the second DCI being a common search space format or the downlink assignment index for the second DCI has at least three bits based on the second format of the second DCI being a format other than the common search space format.

14. The apparatus of claim 13, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station generates the third DCI with the common search space format based on the first format for the first DCI being the common search space format and the second format for the second DCI being a format other than the common search space format.

15. The apparatus of claim 11, wherein generating the plurality of DCIs comprises determining the second format for the second DCI, and wherein the downlink assignment index for the second DCI has a number of bits based on the second format for the second DCI being the multi-PDSCH format, and wherein the downlink assignment index for the second DCI has at least three bits based on the second format for the second DCI being the multi-PDSCH format, or wherein the downlink assignment index for the second DCI has at least three bits based on the format for the second DCI being a format other than the multi-PDSCH format.

16. The apparatus of claim 15, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station generates the third DCI with a multi-PDSCH format based on the first format for the first DCI being a format other than the multi-PDSCH format and a format for a DCI of the second PDCCH being the multi-PDSCH format.

17. The apparatus of claim 16, wherein transmitting the plurality of DCIs to the UE comprises transmitting the first DCI to the UE, transmitting the second DCI to the UE after the first DCI, and transmitting the third DCI to the UE after transmitting the second DCI, wherein the base station does not transmit any other DCI to the UE between the first DCI and the third DCI, and wherein the base station generates the third DCI with a format other than the multi-PDSCH format based on the first format for the first DCI being the multi-PDSCH format and the second format for the second DCI being a format other than the multi-PDSCH format.

18. The apparatus of claim 11, wherein the base station transmits the plurality of DCIs on a first carrier and a second carrier, and wherein the downlink assignment index for the second DCI has a number of bits based on whether the second DCI is transmitted on the first carrier or the second carrier, and wherein the downlink assignment index for the second DCI has at least three bits based on the second DCI being transmitted on the first carrier or the downlink assignment index for the second DCI has two bits based on the second DCI being transmitted on the second carrier.

19. The apparatus of claim 18, further comprising:
transmitting a radio resource control message identifying the first carrier to the UE based on the second DCI being transmitted on the first carrier having at least three bits.

20. The apparatus of claim 18, wherein transmitting the plurality of DCIs to the UE comprises transmitting the first DCI to the UE, transmitting the second DCI to the UE after the first DCI, and transmitting a third DCI to the UE after transmitting the second DCI, wherein the base station does not transmit any other DCI to the UE between the first DCI and the third DCI, and wherein the base station transmits the third DCI on the first carrier based on transmitting the first DCI on the second carrier and transmitting the second PDCCH on the first carrier.

21. A method of wireless communication at a user equipment (UE), comprising:

receiving a plurality of downlink control information messages (DCIs) from a base station, the DCIs identifying physical downlink shared channel (PDSCH) resources for the UE;
determining a number of downlink assignment index bits of a first DCI of the plurality of DCIs based on a first format of the first DCI, based on a carrier for the first DCI, or based on a DCI of the plurality of DCIs having a second format, the second format being a format that can identify PDSCH resources for multiple PDSCHs;
determining that the base station transmitted a second DCI to the UE that the UE did not receive based on the first DCI and the determined number of downlink assignment index bits for the first DCI; and
transmitting a NACK based on determining that the UE did not receive the second DCI,
wherein the UE determines that the base station transmitted the second DCI to the UE based on a modulus of the downlink assignment index modulo eight or more based on determining the number of downlink assignment index bits of the first DCI to be three or more.

22. The method of claim 21, wherein the number of downlink assignment index bits is determined based on a DCI of the plurality of DCI formats having the second format or based on the format of the first DCI.

23. The method of claim 22, wherein the UE determines that the first DCI has three or more downlink assignment index bits based on the first DCI having a common search space format or based on the first DCI having the second format, or based on the first DCI having a format other than the second format.

24. The method of claim 21, wherein the UE receives the plurality of DCIs on a first carrier and on a second carrier, and wherein the UE determines that the first DCI has three or more downlink assignment index bits based on receiving the first DCI on the first carrier, or based on an indicator from the base station identifying the first carrier.

25. The method of claim 24, wherein:
determining that the base station transmitted the second DCI to the UE comprises comparing the downlink assignment index bits of the first DCI to downlink assignment index bits of a third DCI of the plurality of DCIs, and
the UE receives the third DCI before the first DCI and the UE does not receive another DCI between the third DCI and the first DCI.

26. The method of claim 24, wherein:
the UE may determine the number of downlink assignment index bits of the first DCI to be two bits or to be three or more bits,
the downlink assignment index bits of the first DCI are based on a downlink assignment index value of the first DCI; and
the UE determines that the base station transmitted the second DCI to the UE based on a modulus of the downlink assignment index modulo four based on determining the number of downlink assignment index bits of the first DCI to be two.

27. An apparatus for wireless communication at a user equipment (UE), comprising:
a memory; and
at least one processor coupled to the memory and configured to:
receive a plurality of downlink control information messages (DCIs) from a base station, the DCIs identifying physical downlink shared channel (PDSCH) resources for the UE;
determine a number of downlink assignment index bits of a first DCI of the plurality of DCIs based on a first format of the first DCI, based on a carrier for the first DCI, or based on a DCI of the plurality of DCIs having a second format, the second format being a format that can identify PDSCH resources for multiple PDSCHs;
determine that the base station transmitted a second DCI to the UE that the UE did not receive based on the first DCI and the determined number of downlink assignment index bits for the first DCI; and
transmit a NACK based on the determination that the UE did not receive the second DCI,
wherein the UE determines that the base station transmitted the second DCI to the UE based on a modulus of the downlink assignment index modulo eight or more based on determining the number of downlink assignment index bits of the first DCI to be three or more.

28. The apparatus of claim 27, wherein the number of downlink assignment index bits is determined based on a DCI of the plurality of DCI formats having the second format, or based on the first format of the first DCI.

29. The apparatus of claim 28, wherein the UE determines that the first DCI has three or more downlink assignment index bits based on the first DCI having a common search space format, or based on the first DCI having the second format, or based on the first DCI having a format other than the second format.

30. The apparatus of claim 27, wherein the UE receives the plurality of DCIs on a first carrier and on a second carrier, and wherein the UE determines that the first DCI has three or more downlink assignment index bits based on receiving the first DCI on the first carrier, or based on an indicator from the base station identifying the first carrier.

* * * * *